United States Patent
Harris et al.

(10) Patent No.: US 7,627,056 B1
(45) Date of Patent: Dec. 1, 2009

(54) SYSTEM AND METHOD FOR ORTHOGONALLY MULTIPLEXED SIGNAL TRANSMISSION AND RECEPTION ON A NON-CONTIGUOUS SPECTRAL BASIS

(75) Inventors: Fredric J. Harris, Lemon Grove, CA (US); Erik H. Kjeldsen, Marietta, GA (US)

(73) Assignee: Scientific Research Corporation, Atlanta, GA (US)

( * ) Notice: Subject to any disclaimer, the term of this patent is extended or adjusted under 35 U.S.C. 154(b) by 636 days.

(21) Appl. No.: 11/558,613

(22) Filed: Nov. 10, 2006

Related U.S. Application Data

(63) Continuation-in-part of application No. 10/400,834, filed on Mar. 27, 2003, now Pat. No. 7,206,359.

(60) Provisional application No. 60/368,549, filed on Mar. 29, 2002.

(51) Int. Cl.
  H04K 1/02 (2006.01)
  H03D 1/04 (2006.01)
  H04B 1/10 (2006.01)

(52) U.S. Cl. .............. 375/296; 375/260; 375/316; 375/346; 375/350

(58) Field of Classification Search ........... 375/260, 375/295, 296, 316, 346, 350
See application file for complete search history.

(56) References Cited

U.S. PATENT DOCUMENTS

| | | | |
|---|---|---|---|
| 5,367,516 A | 11/1994 | Miller | |
| 5,491,561 A | 2/1996 | Fukuda | |
| 5,995,539 A | 11/1999 | Miller | |
| 6,222,851 B1 * | 4/2001 | Petry | 370/447 |
| 6,263,017 B1 | 7/2001 | Miller | |
| RE37,802 E * | 7/2002 | Fattouche et al. | 375/141 |
| 6,532,256 B2 * | 3/2003 | Miller | 375/222 |
| 6,549,566 B1 * | 4/2003 | Lee et al. | 375/219 |
| 6,581,081 B1 | 6/2003 | Messerly et al. | |
| 6,628,673 B1 * | 9/2003 | McFarland et al. | 370/481 |
| 6,665,349 B1 | 12/2003 | Cherubini et al. | |
| 7,079,588 B1 * | 7/2006 | Doucette et al. | 375/295 |
| 7,206,359 B2 | 4/2007 | Kjeldsen et al. | |
| 7,308,047 B2 * | 12/2007 | Sadowsky | 375/324 |
| 7,317,761 B2 * | 1/2008 | Lozhkin | 375/260 |
| 7,318,185 B2 * | 1/2008 | Khandani et al. | 714/758 |
| 7,450,491 B2 * | 11/2008 | Yang | 370/208 |
| 7,489,665 B1 * | 2/2009 | Tewfik et al. | 370/335 |
| 7,526,044 B2 * | 4/2009 | Koga et al. | 375/295 |
| 7,532,676 B2 * | 5/2009 | Fonseka et al. | 375/265 |
| 7,542,504 B2 * | 6/2009 | Chang et al. | 375/132 |

(Continued)

OTHER PUBLICATIONS

F. J. Harris, et al., 'An Improved Square-Root Nyquist Shaping Filter,' *Software Defined Radio Technical Conference*, Orange County, California, Nov. 14-18, 2005.

*Primary Examiner*—Jason M. Perilla
(74) *Attorney, Agent, or Firm*—Brenda O. Holmes; Kilpatrick Stockton LLP

(57) ABSTRACT

A wireless communication system implements Forward Error Correction ("FEC") and Interpolated Tree Orthogonal Multiplexing ("ITOM"). ITOM is a compact spectral waveform variant that uses a dyadic tree structure. The tree structure facilitates a flexible mapping of the transmit waveform to the available spectrum bandwidth on a non-contiguous and multiresolution basis. The system includes a receiver that implements a maximum likelihood ("ML") synchronization scheme, which is pulse shape independent and non-data aided.

38 Claims, 35 Drawing Sheets

U.S. PATENT DOCUMENTS

2001/0033612 A1 10/2001 Peeters
2002/0181388 A1 12/2002 Jain et al.
2002/0181617 A1 12/2002 Carleton
2002/0196862 A1 12/2002 Dill et al.
2005/0228654 A1* 10/2005 Prieto et al. ................. 704/220

* cited by examiner

Figure 2. MLNDA Symbol Timing Recovery

Figure 3. MLNDA Symbol Recovery With QA Interpolation

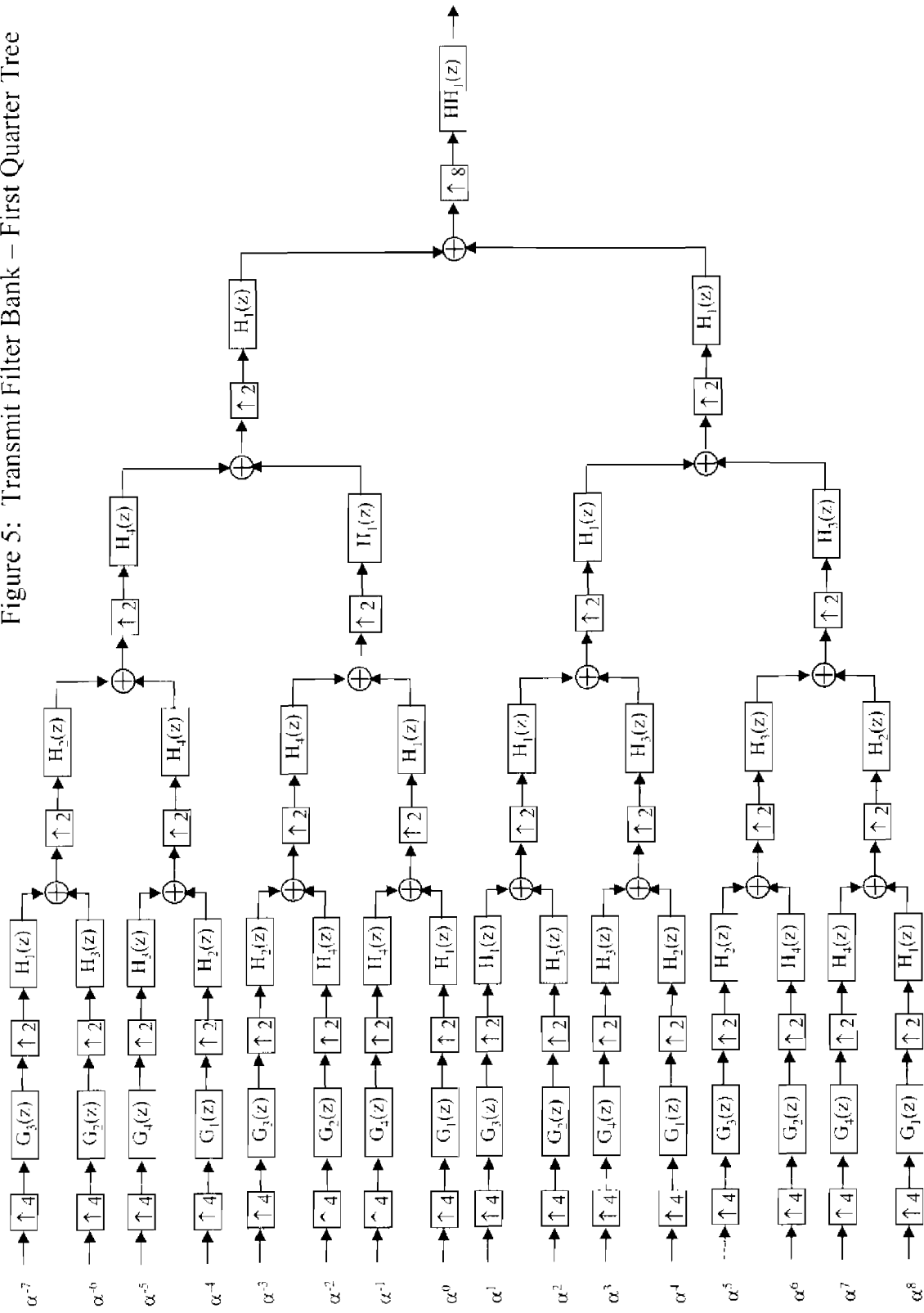

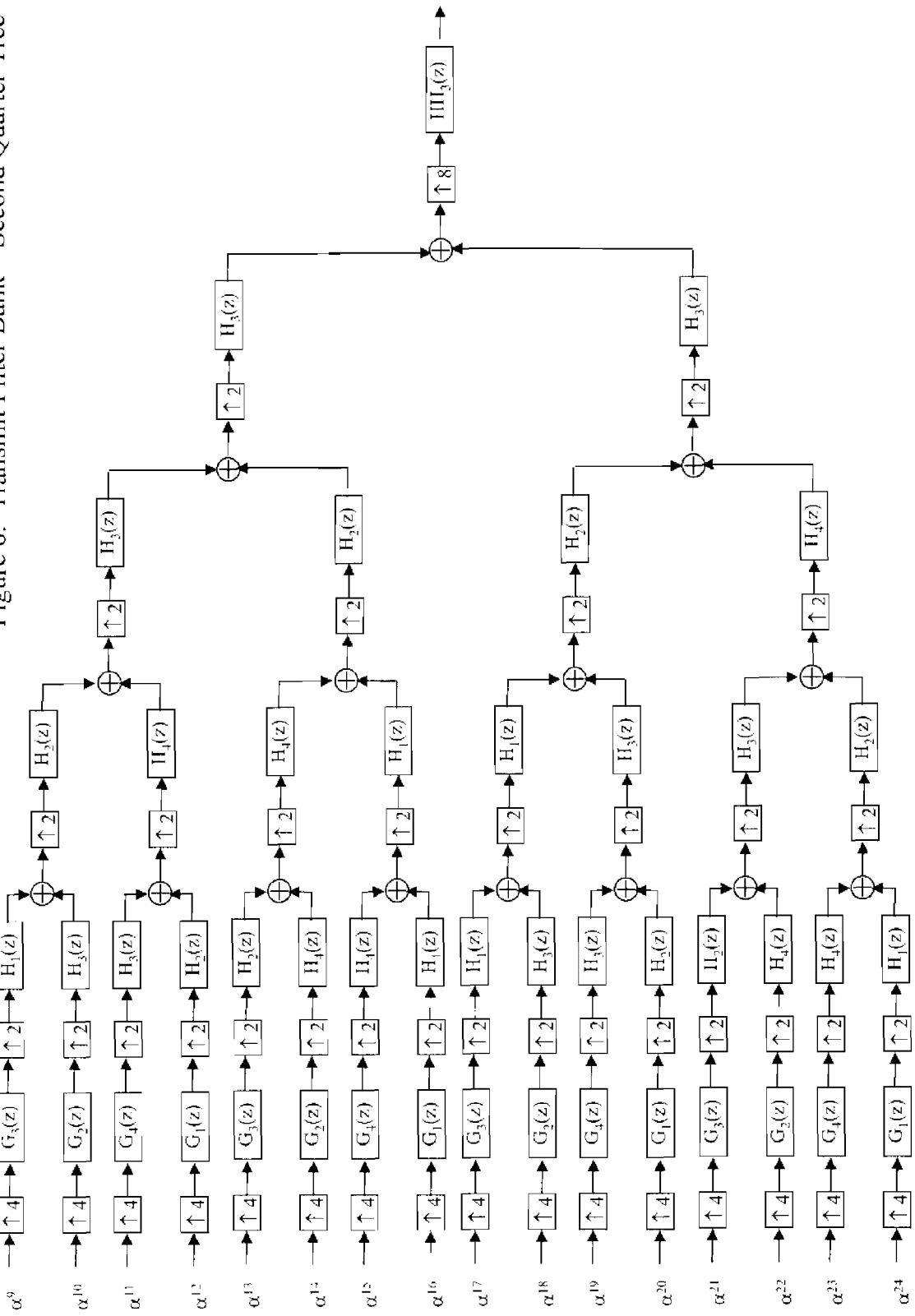
Figure 6: Transmit Filter Bank – Second Quarter Tree

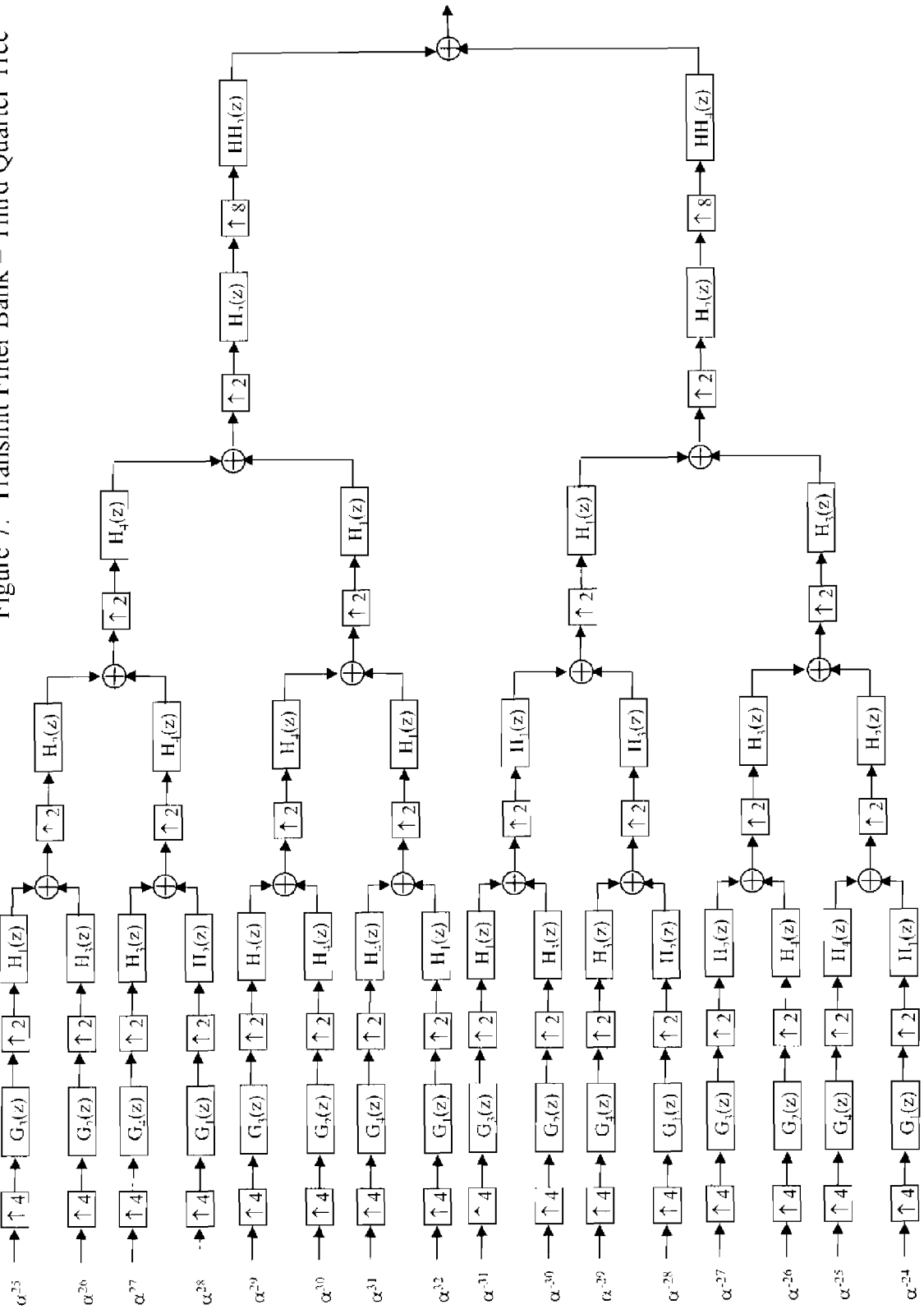
Figure 7: Transmit Filter Bank – Third Quarter Tree

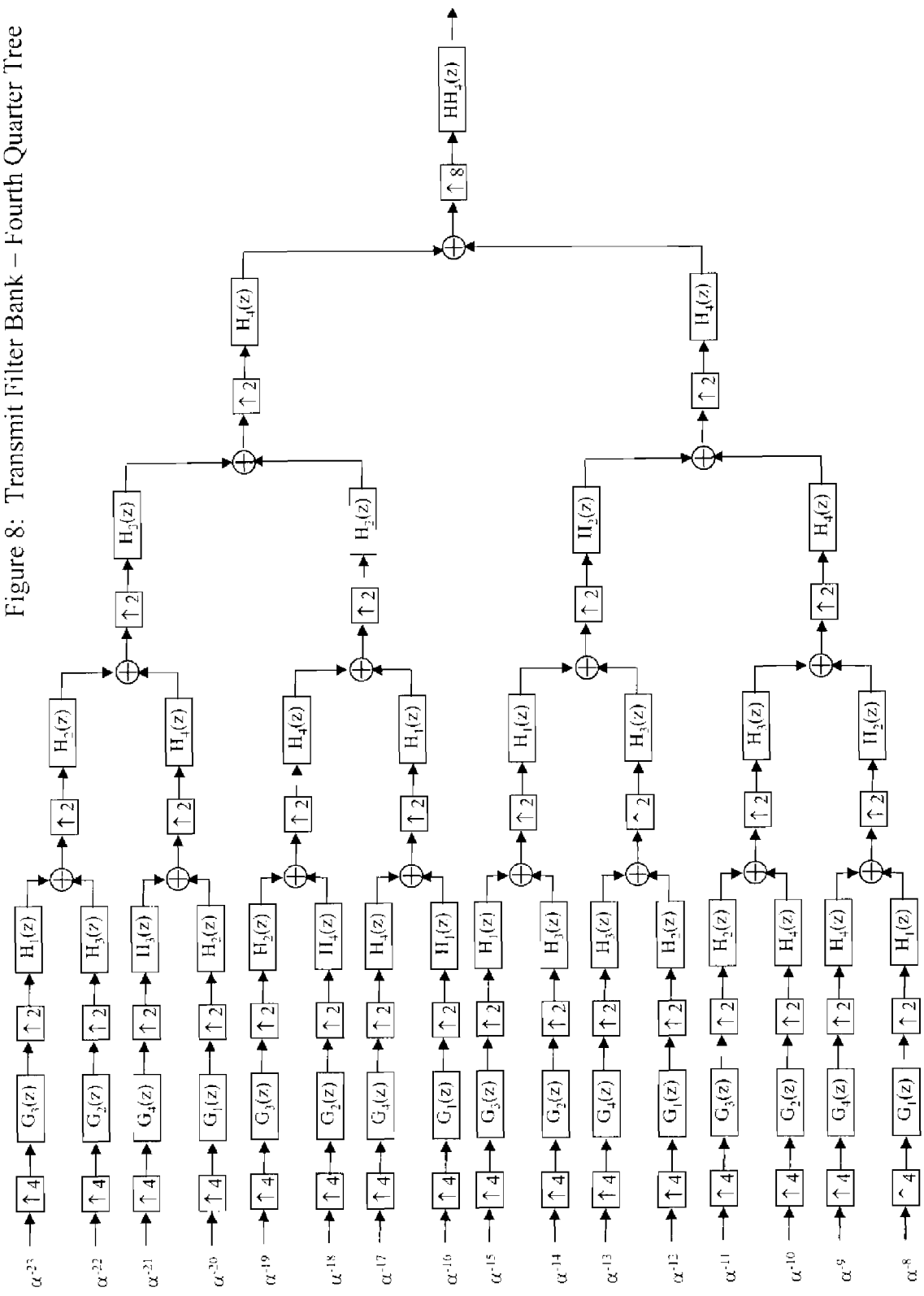
Figure 8: Transmit Filter Bank – Fourth Quarter Tree

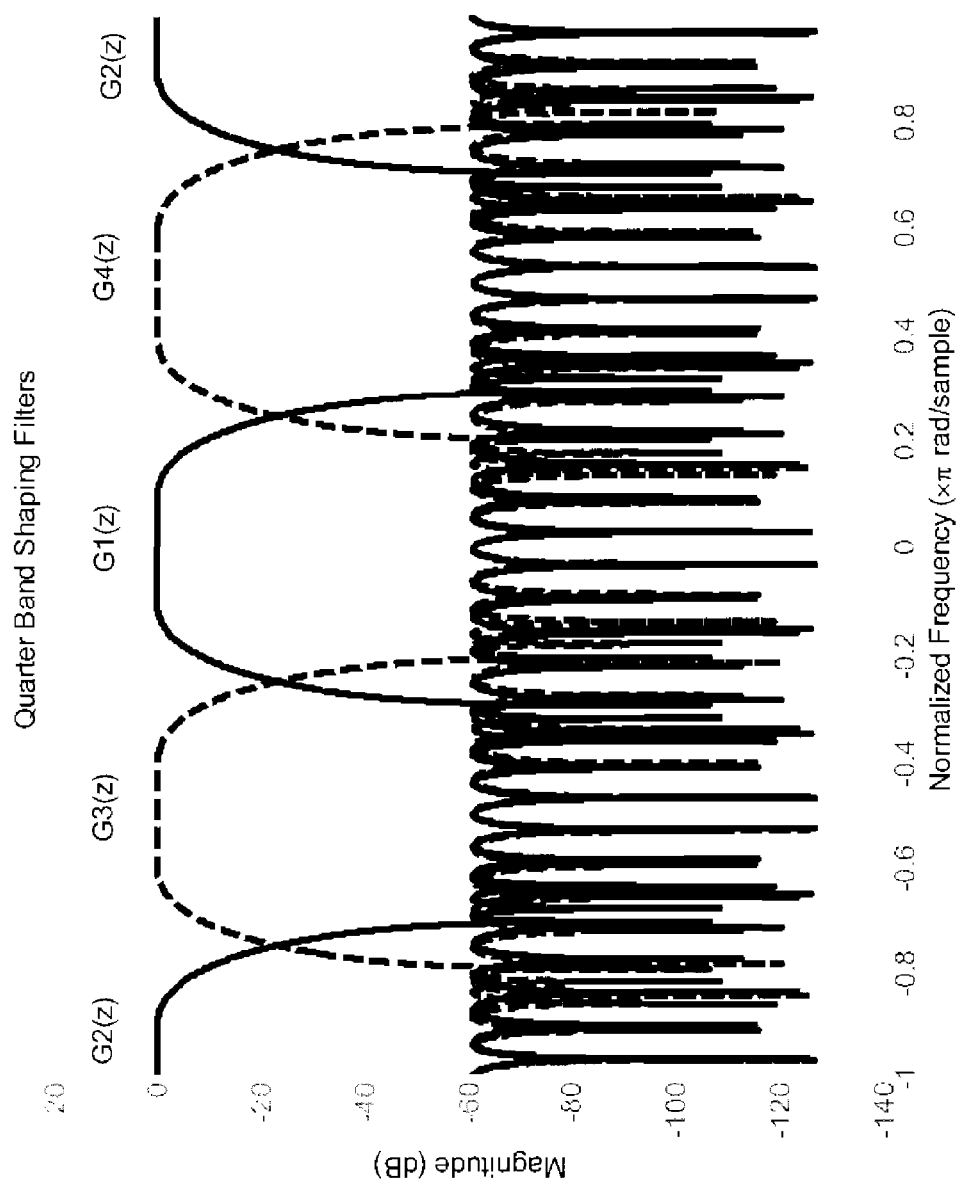
Figure 9: Quarter Band Shaping Filter Spectra

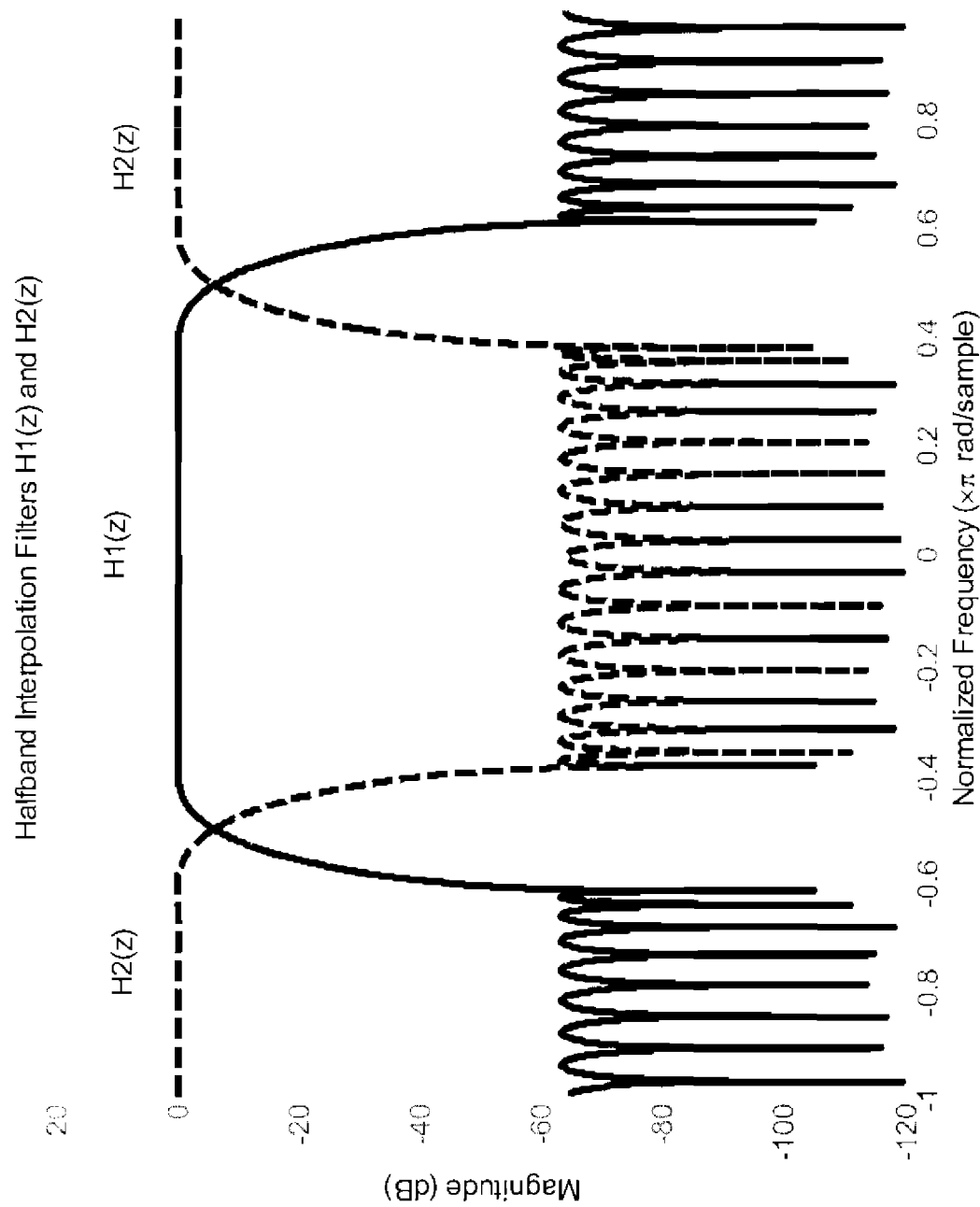
Figure 10: Half Band Interpolation Lowpass/Highpass Filter Spectra

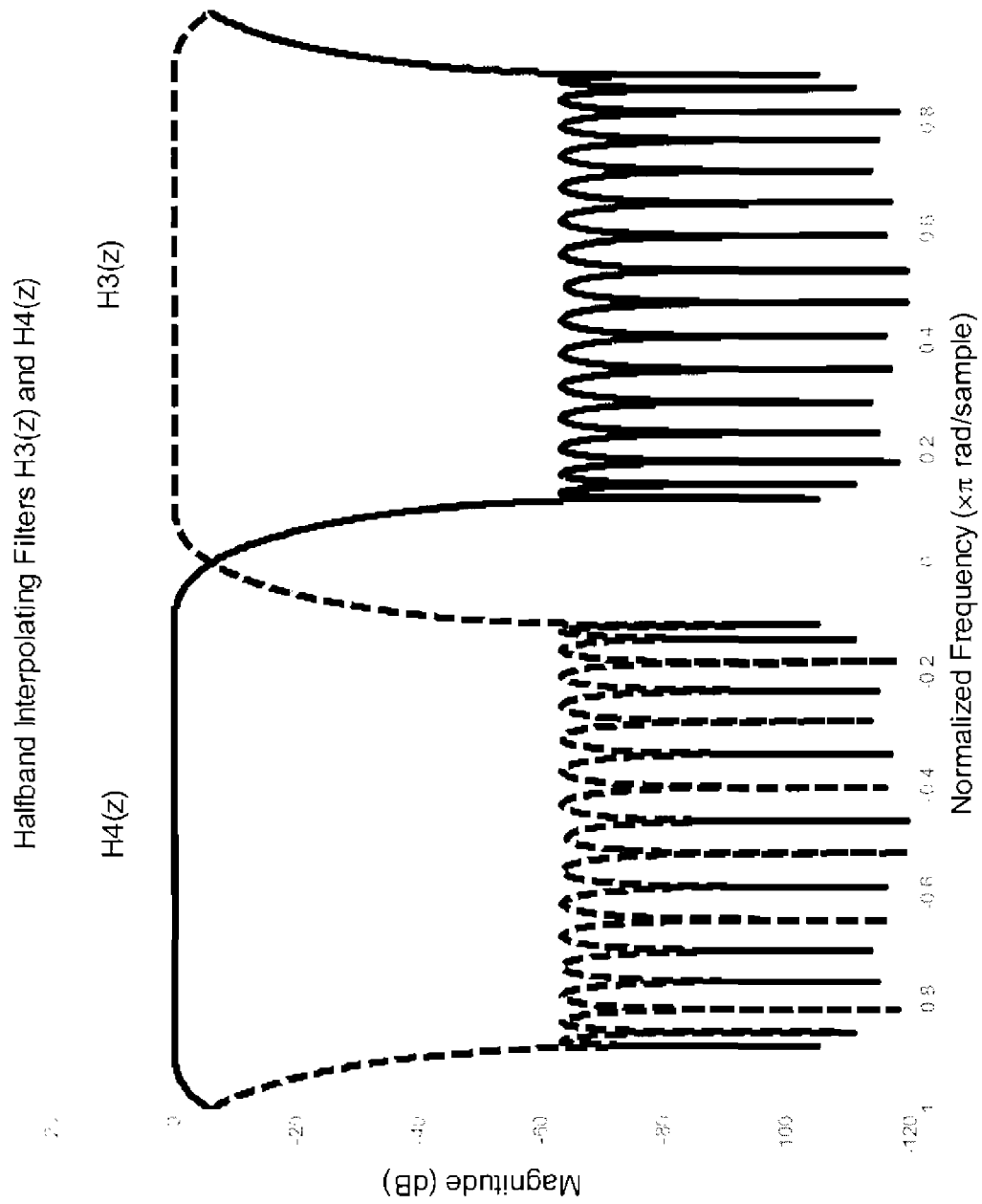
Figure 11: Half Band Interpolation Positive/Negative Frequency Filter Spectra

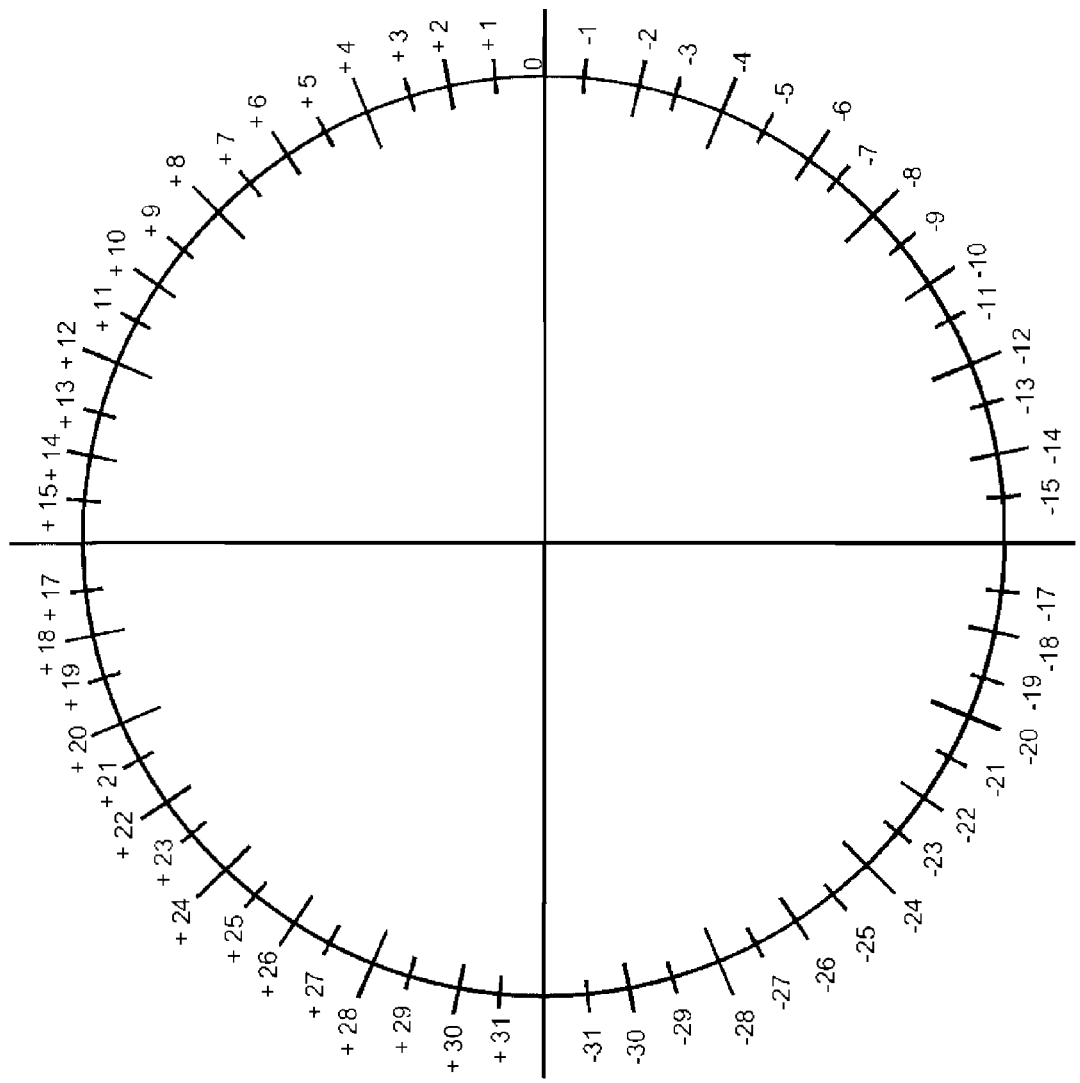
Figure 12: Bandwidth Partition As Viewed On Unit Circle

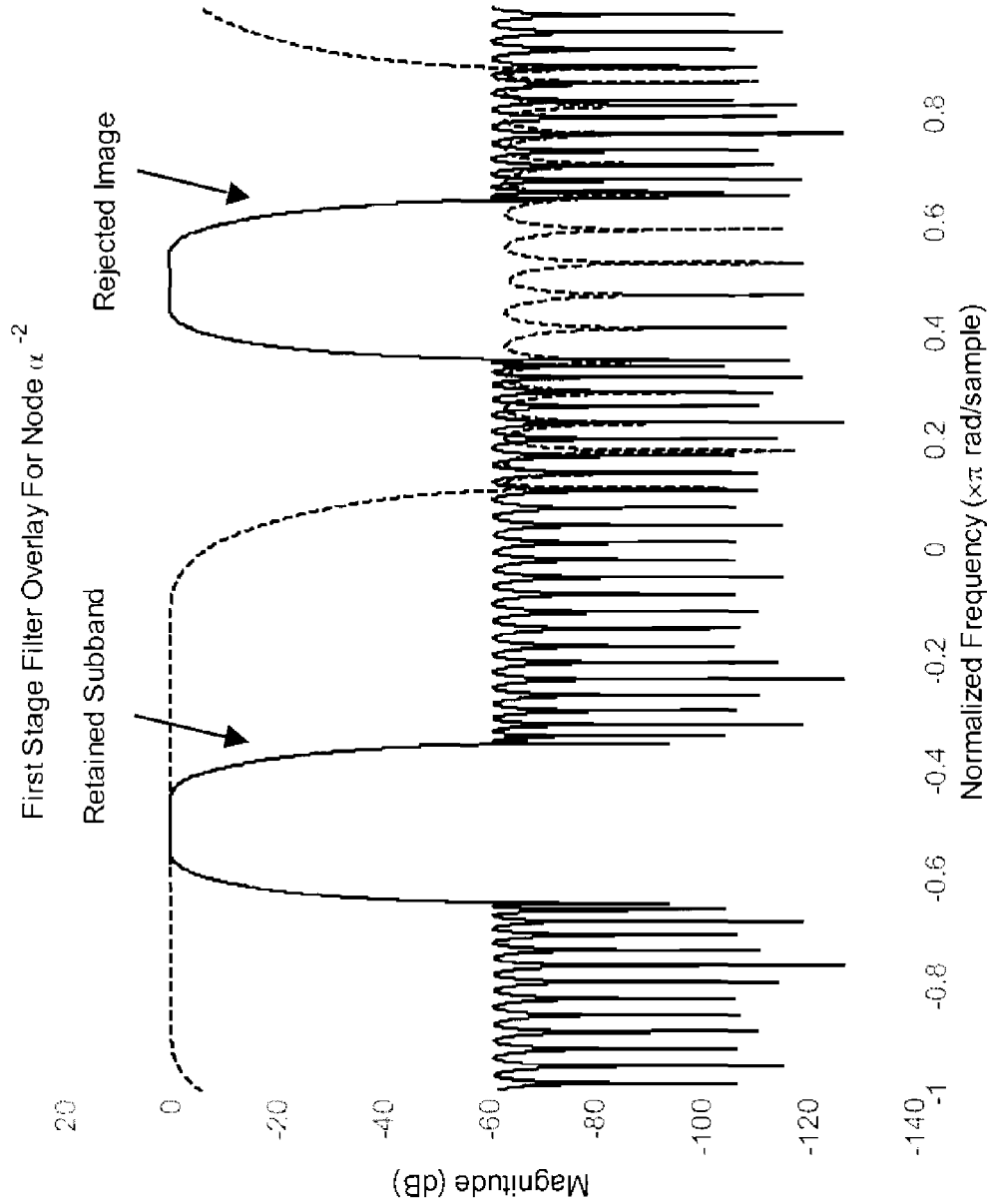
Figure 13: First Stage Filter Overlay For Node $\alpha^{-2}$

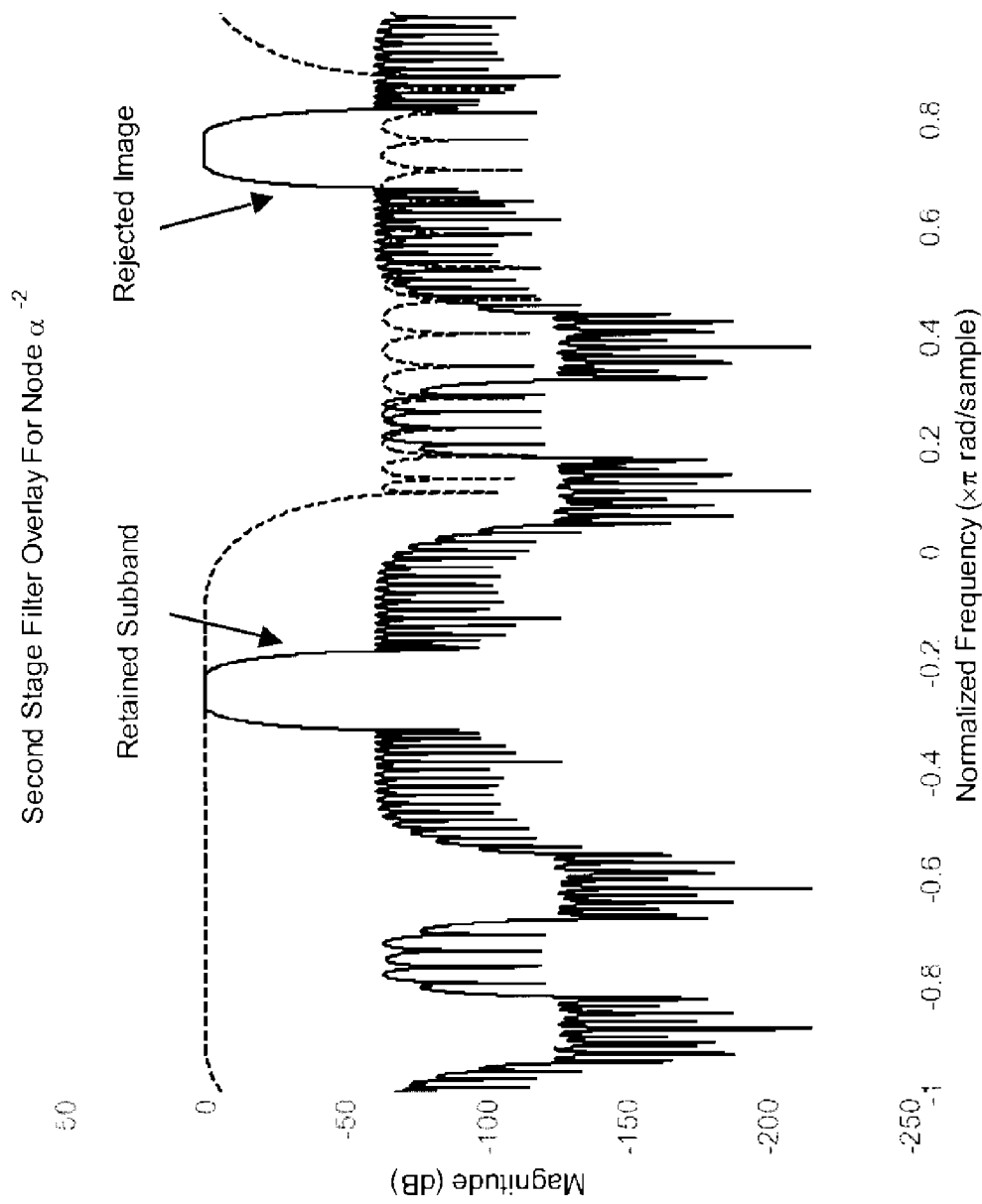
Figure 14: Second Stage Filter Overlay For Node $\alpha^{-2}$

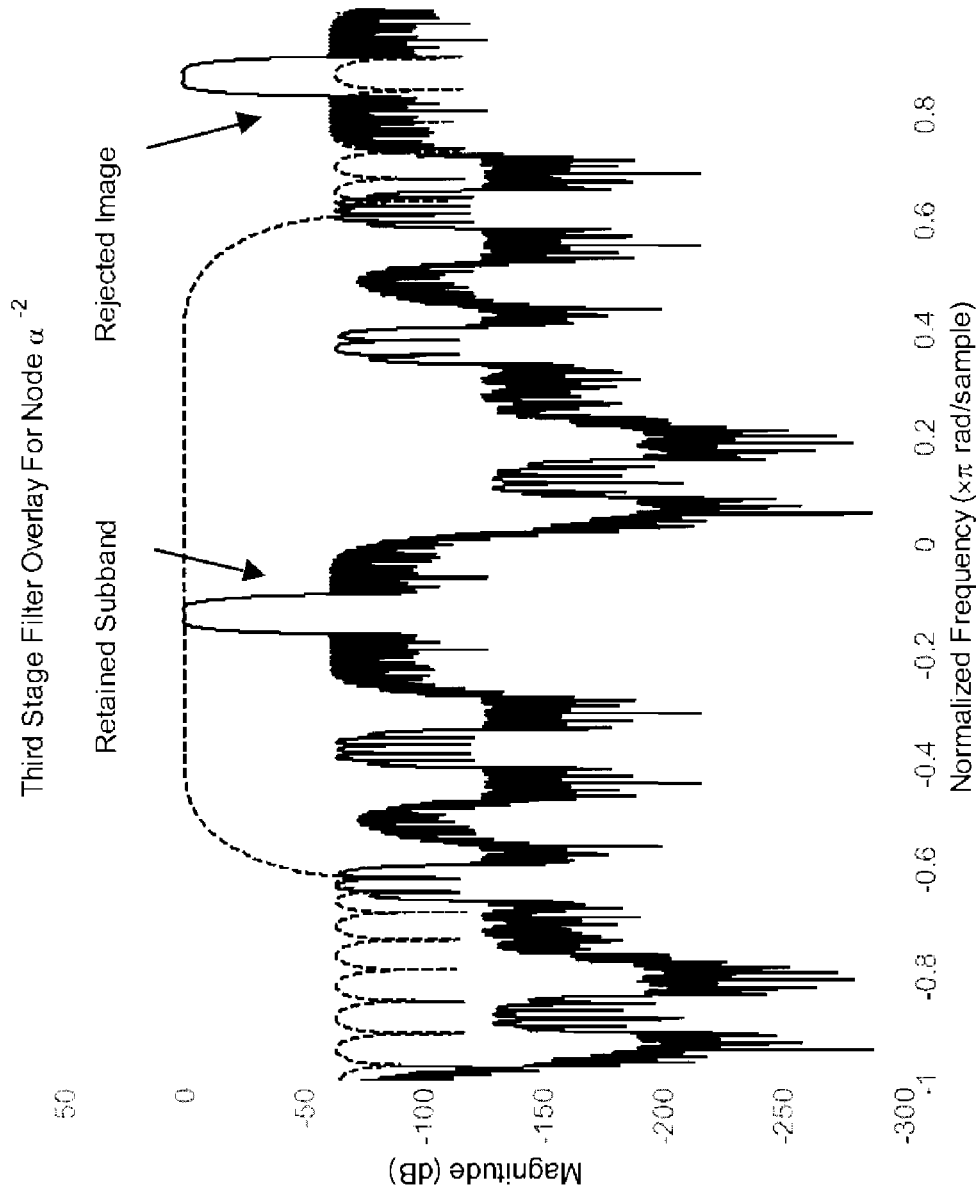
Figure 15: Third Stage Filter Overlay For Node $\alpha^{-2}$

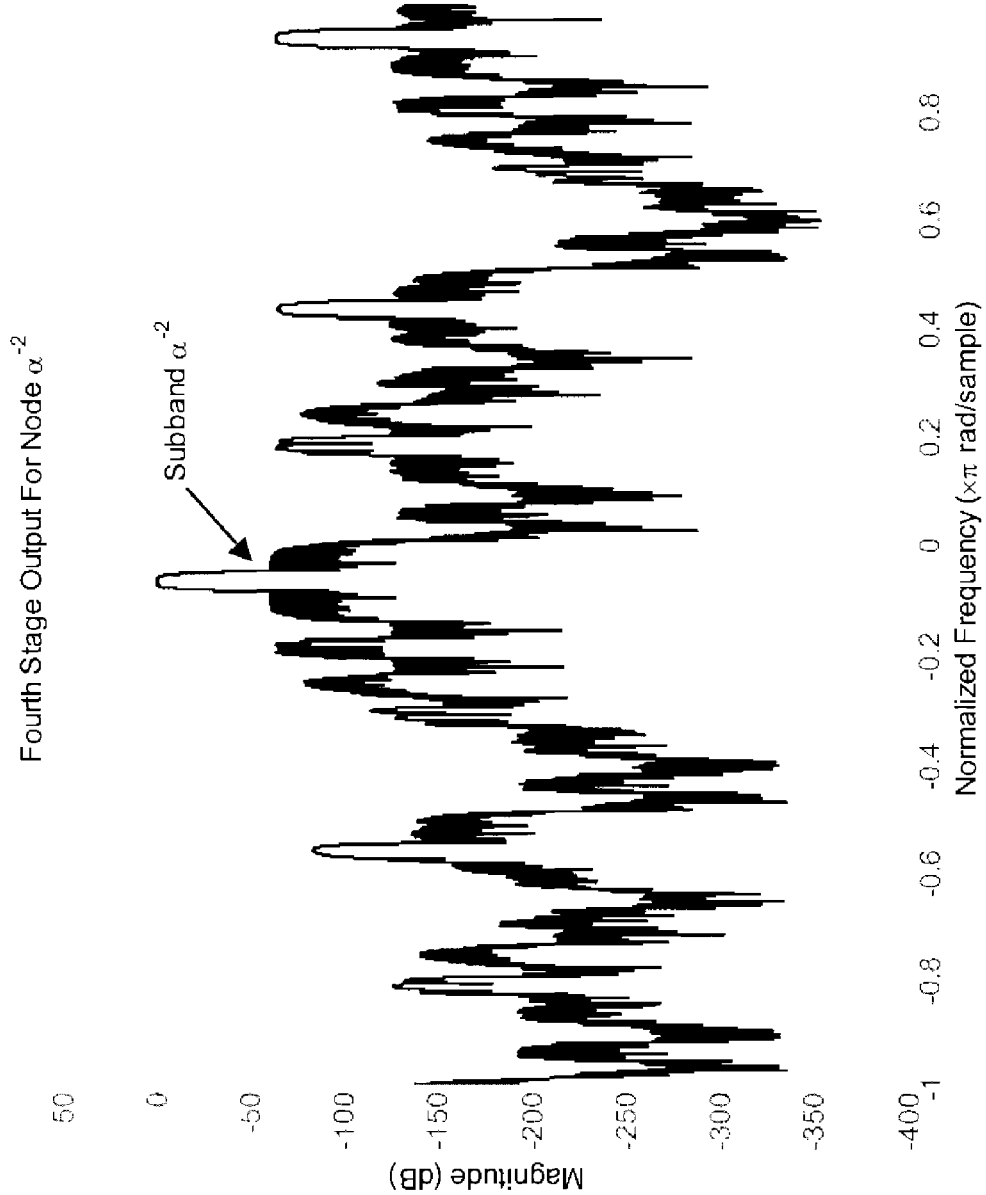
Figure 16: Fourth Stage Filter Overlay For Node $\alpha^{-2}$

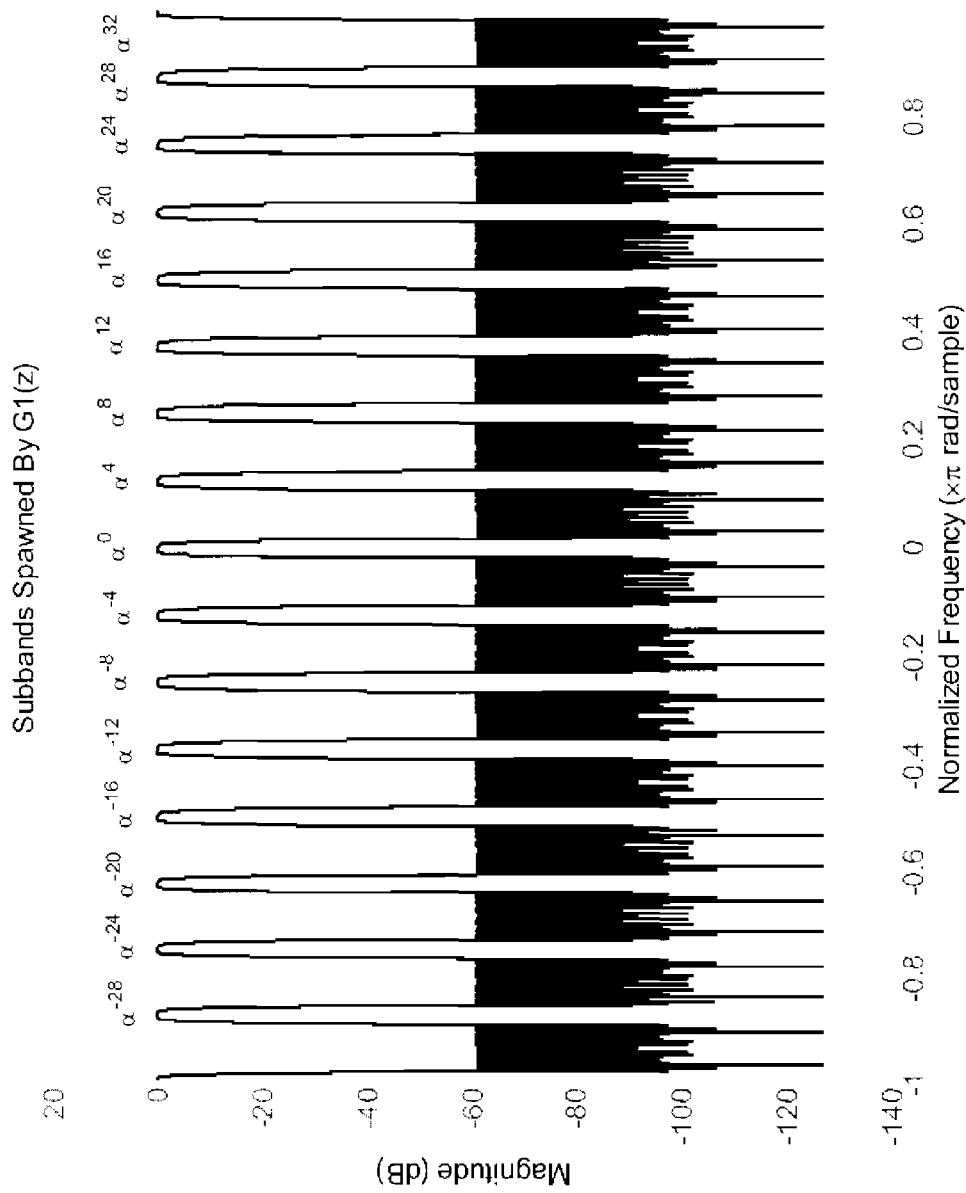
Figure 17: Subbands Spawned By G1(z)

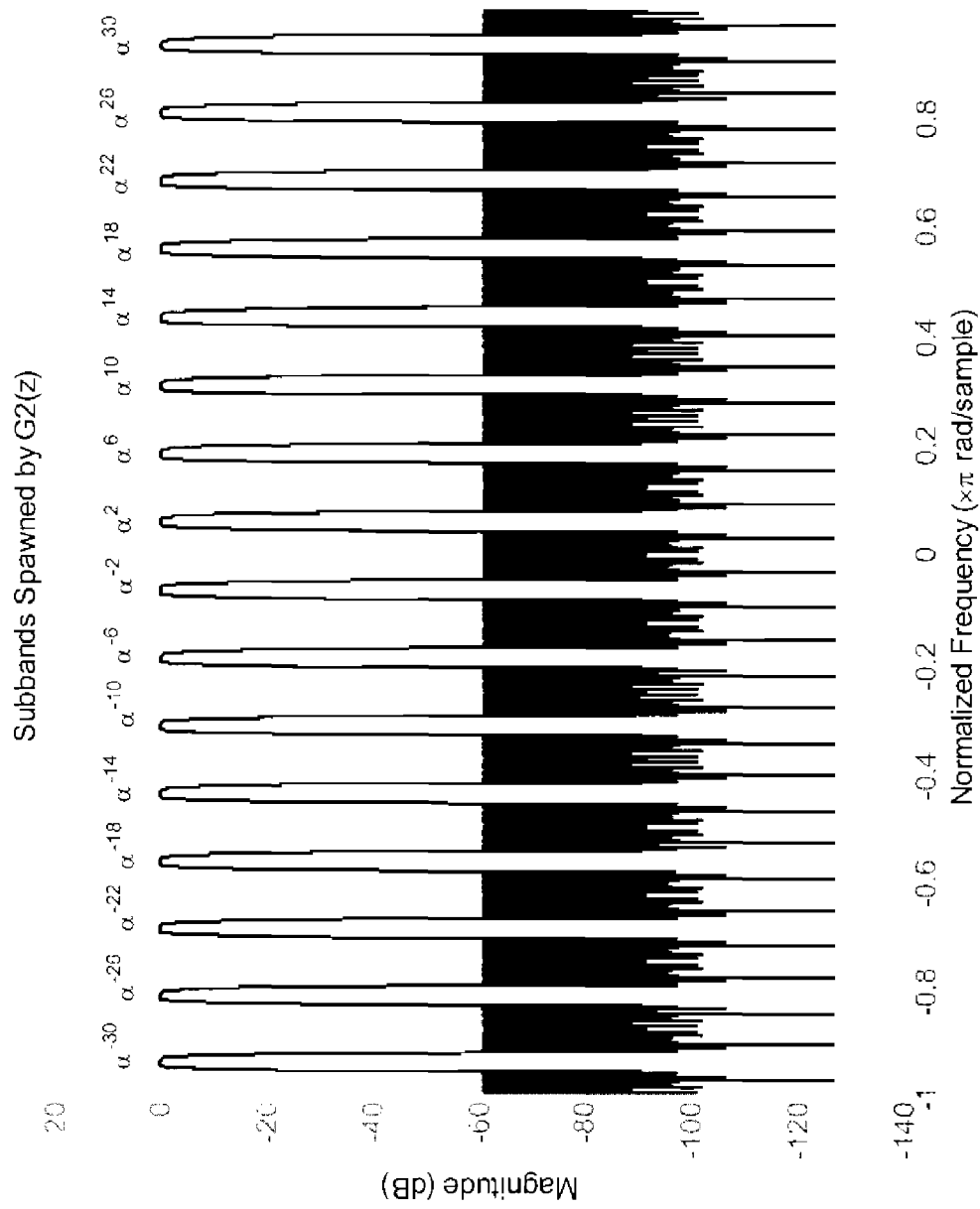
Figure 18: Subbands Spawned By G2(z)

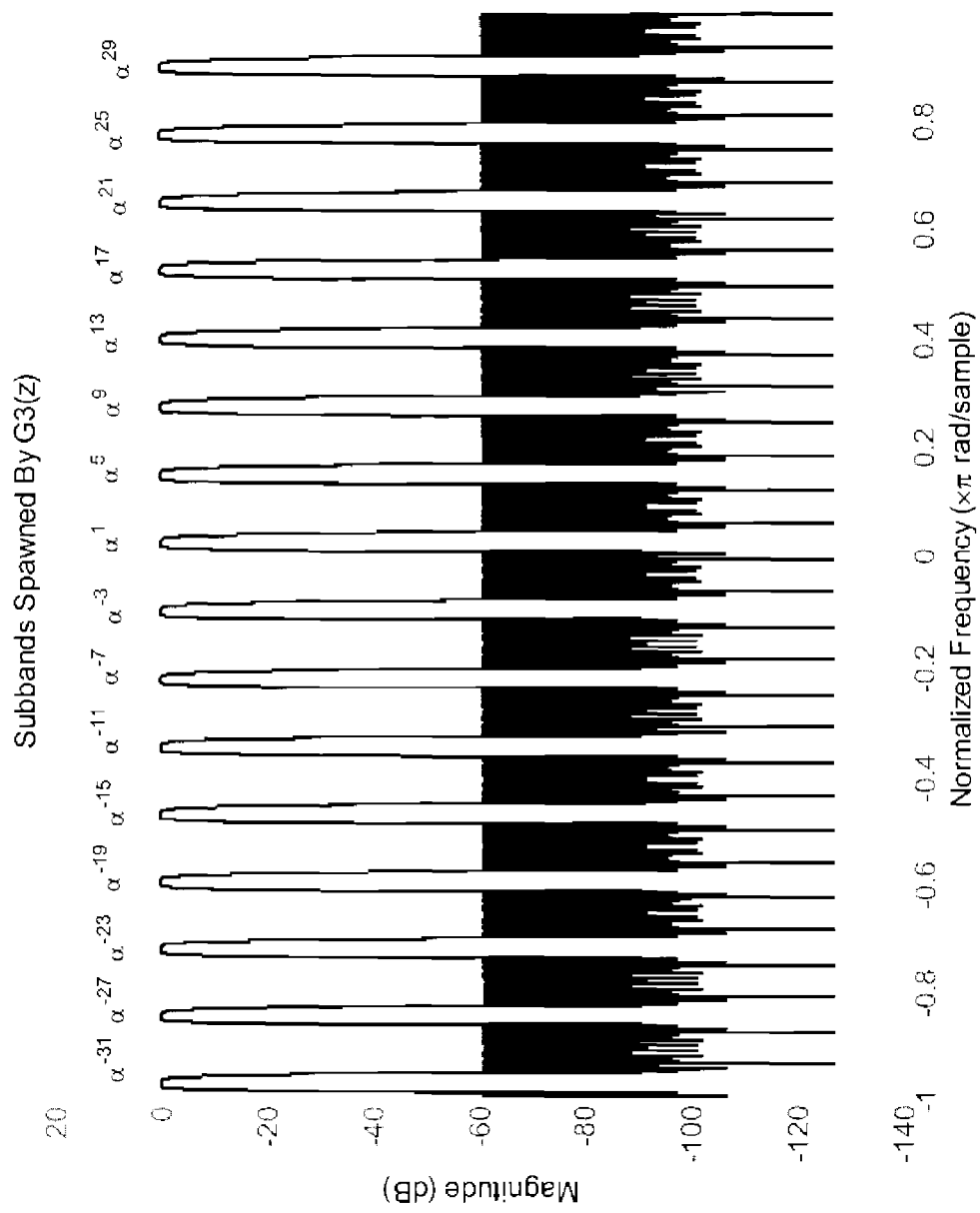
Figure 19: Subbands Spawned By G3(z)

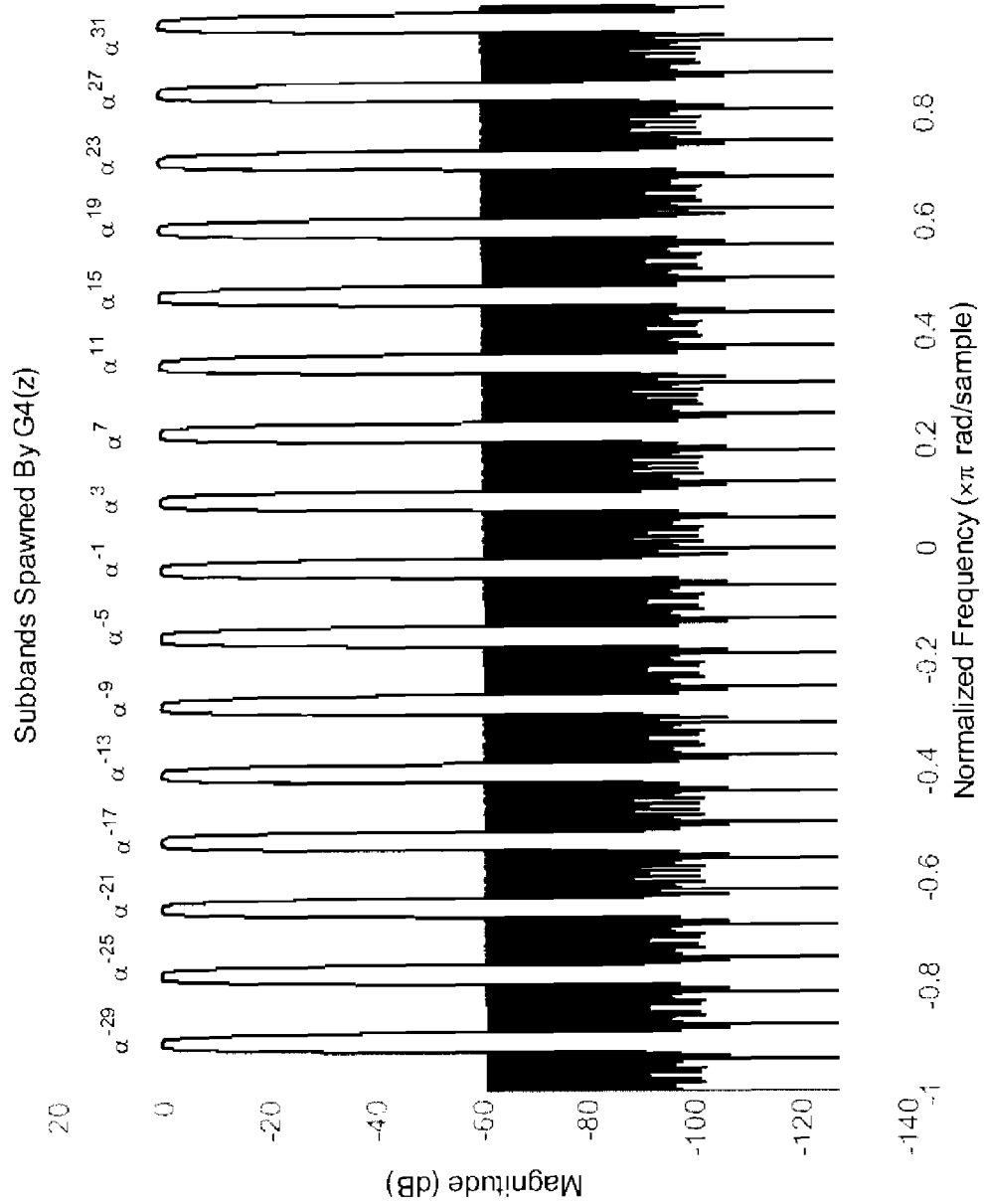
Figure 20: Subbands Spawned By G4(z)

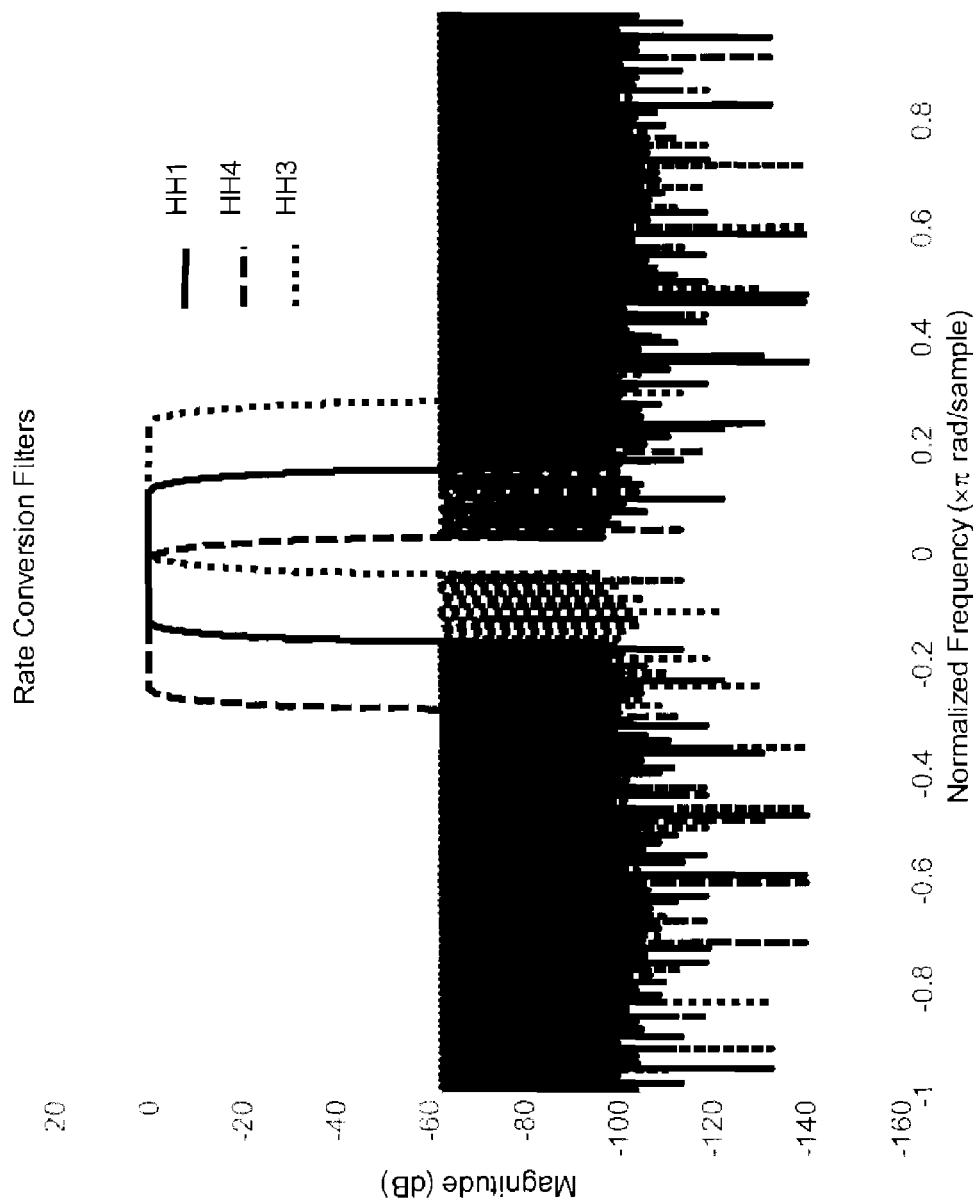
Figure 21: Rate Conversion Filters

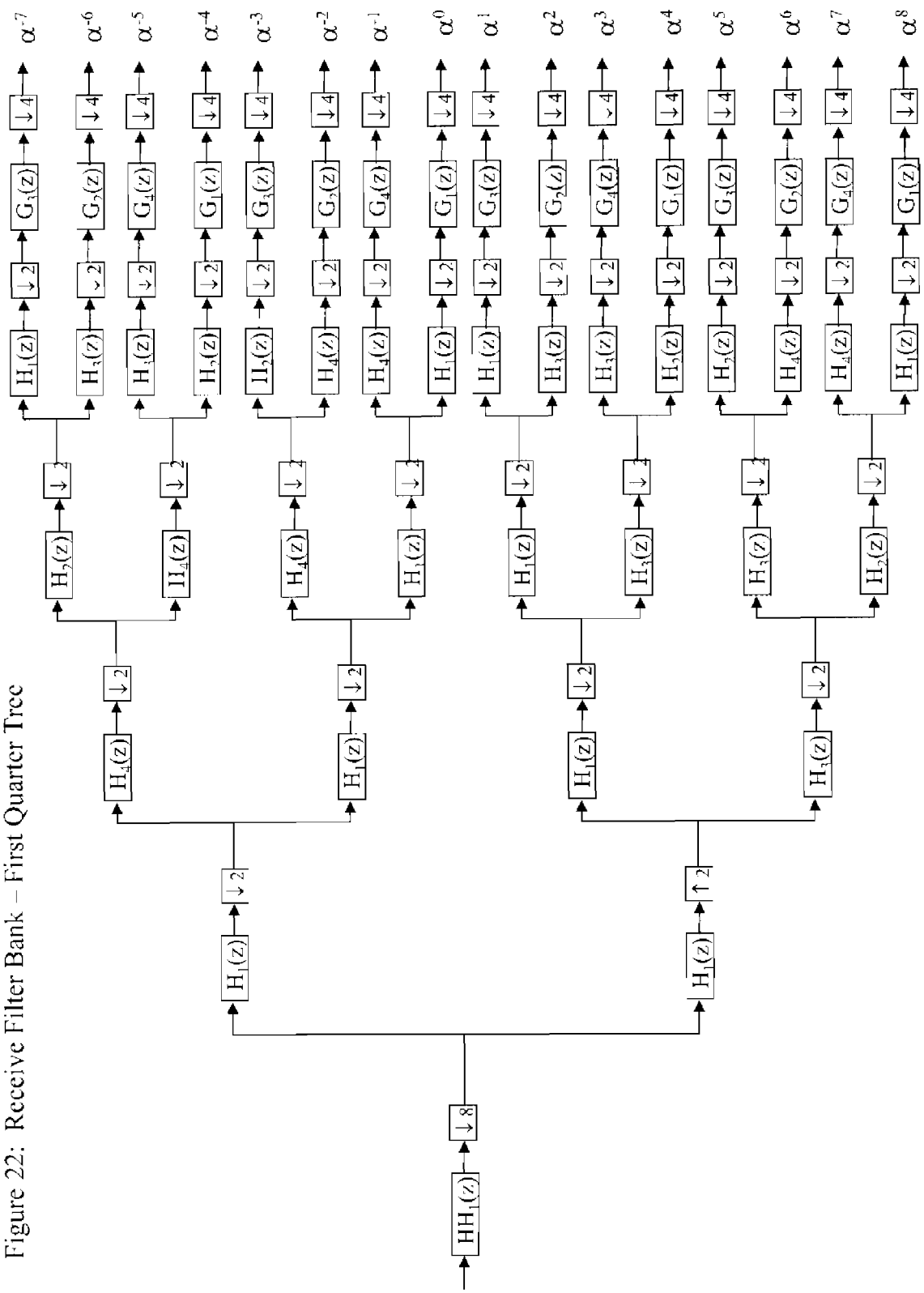
Figure 22: Receive Filter Bank – First Quarter Tree

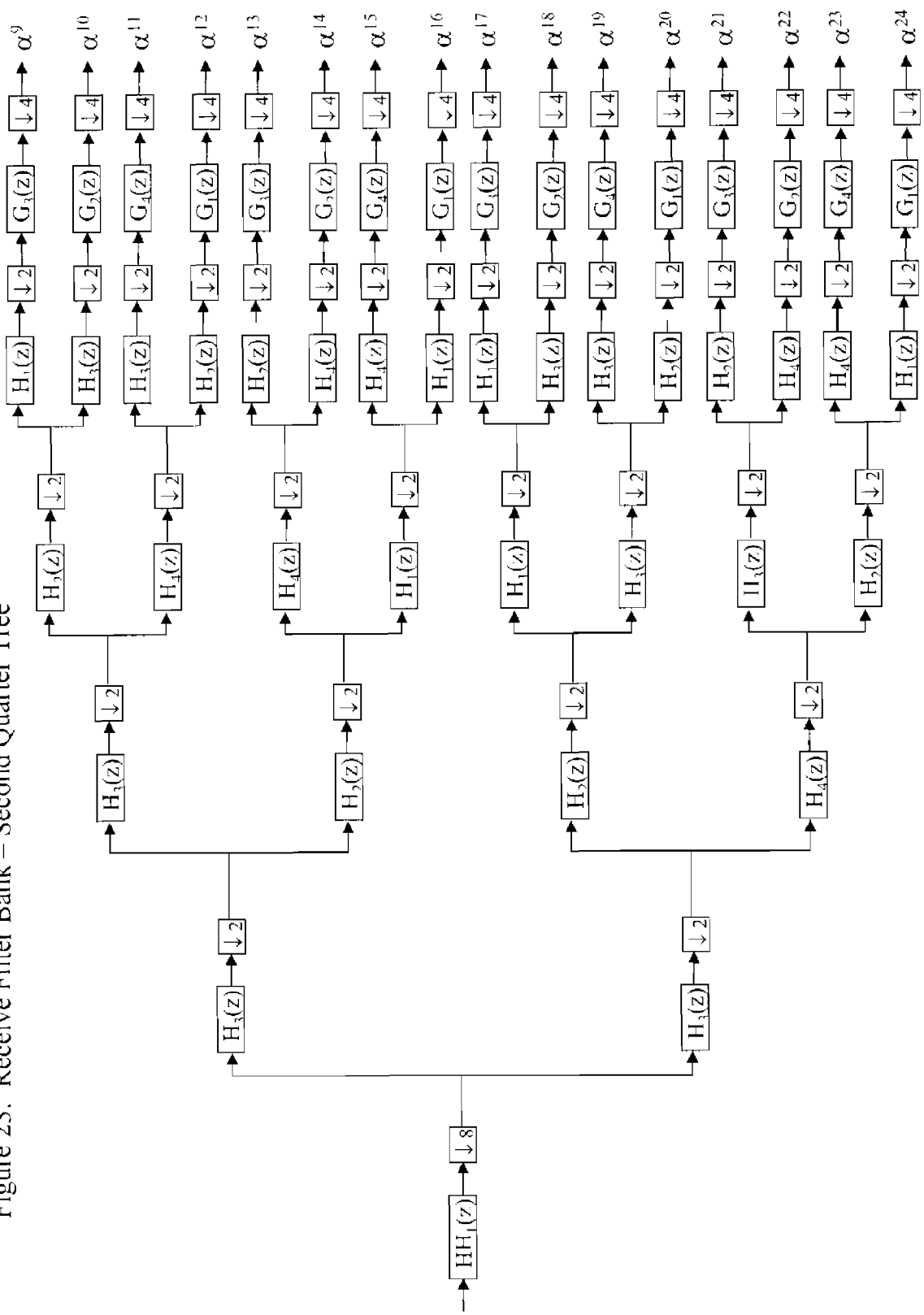
Figure 23: Receive Filter Bank – Second Quarter Tree

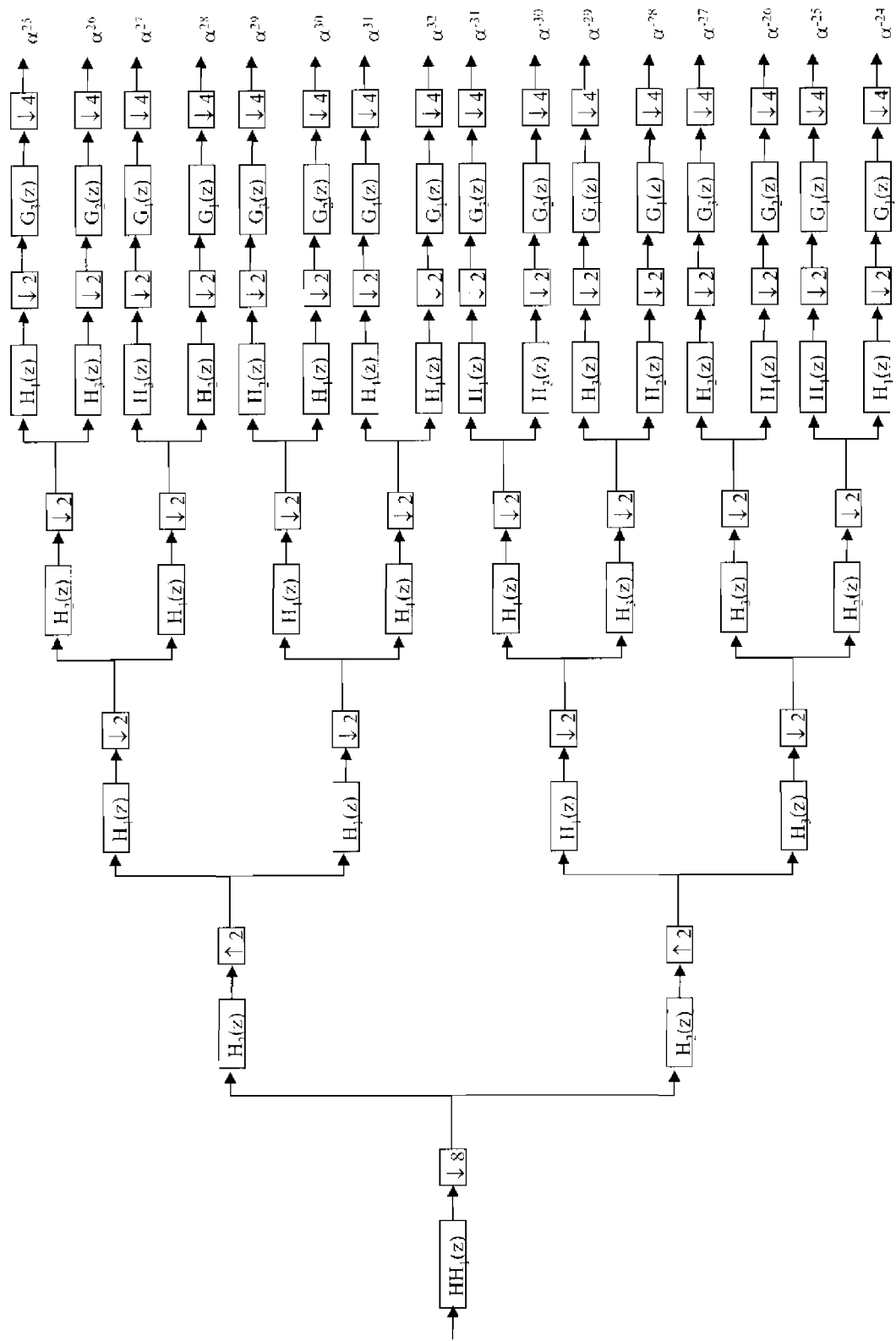
Figure 24: Receive Filter Bank – Third Quarter Tree

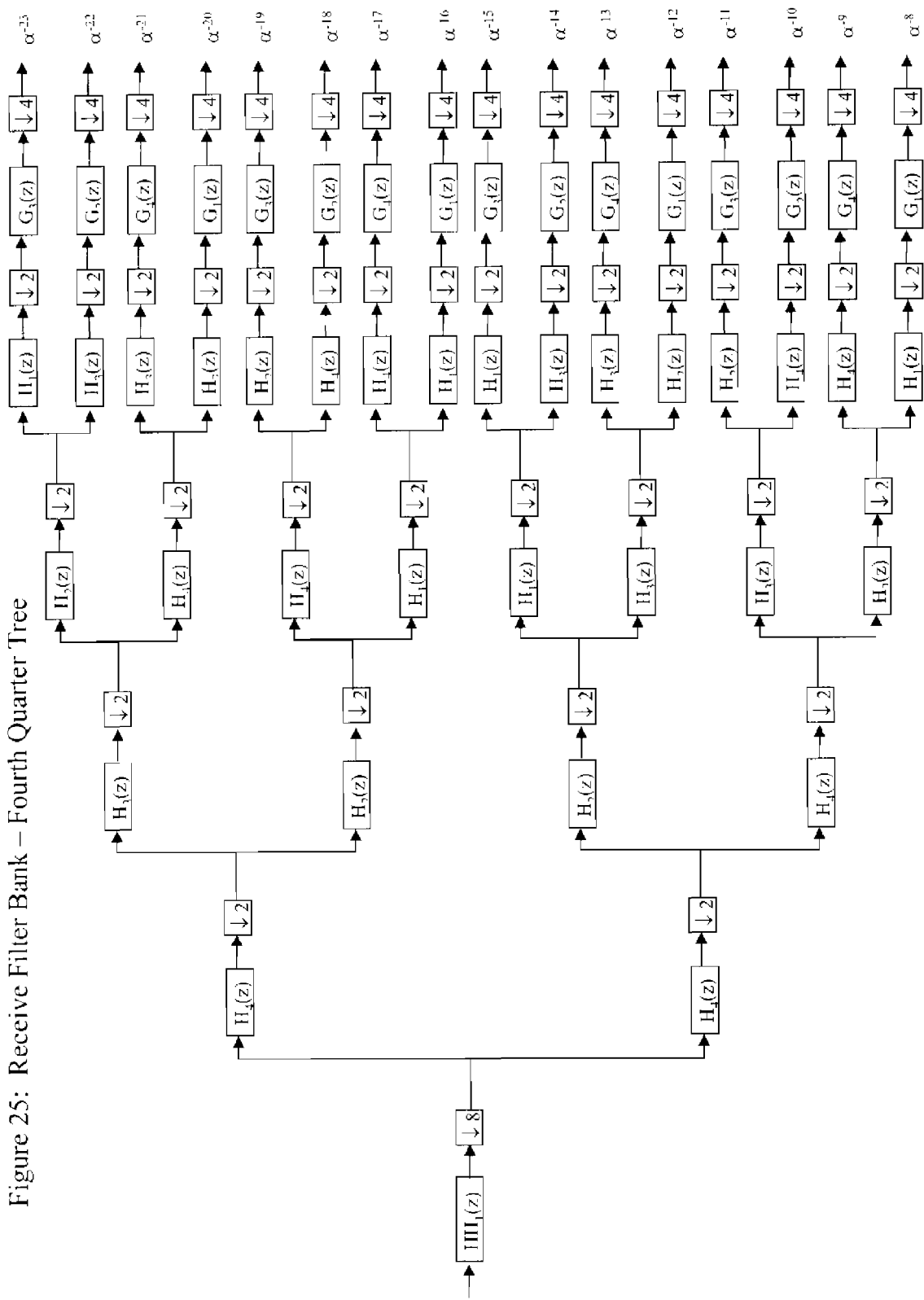
Figure 25: Receive Filter Bank – Fourth Quarter Tree

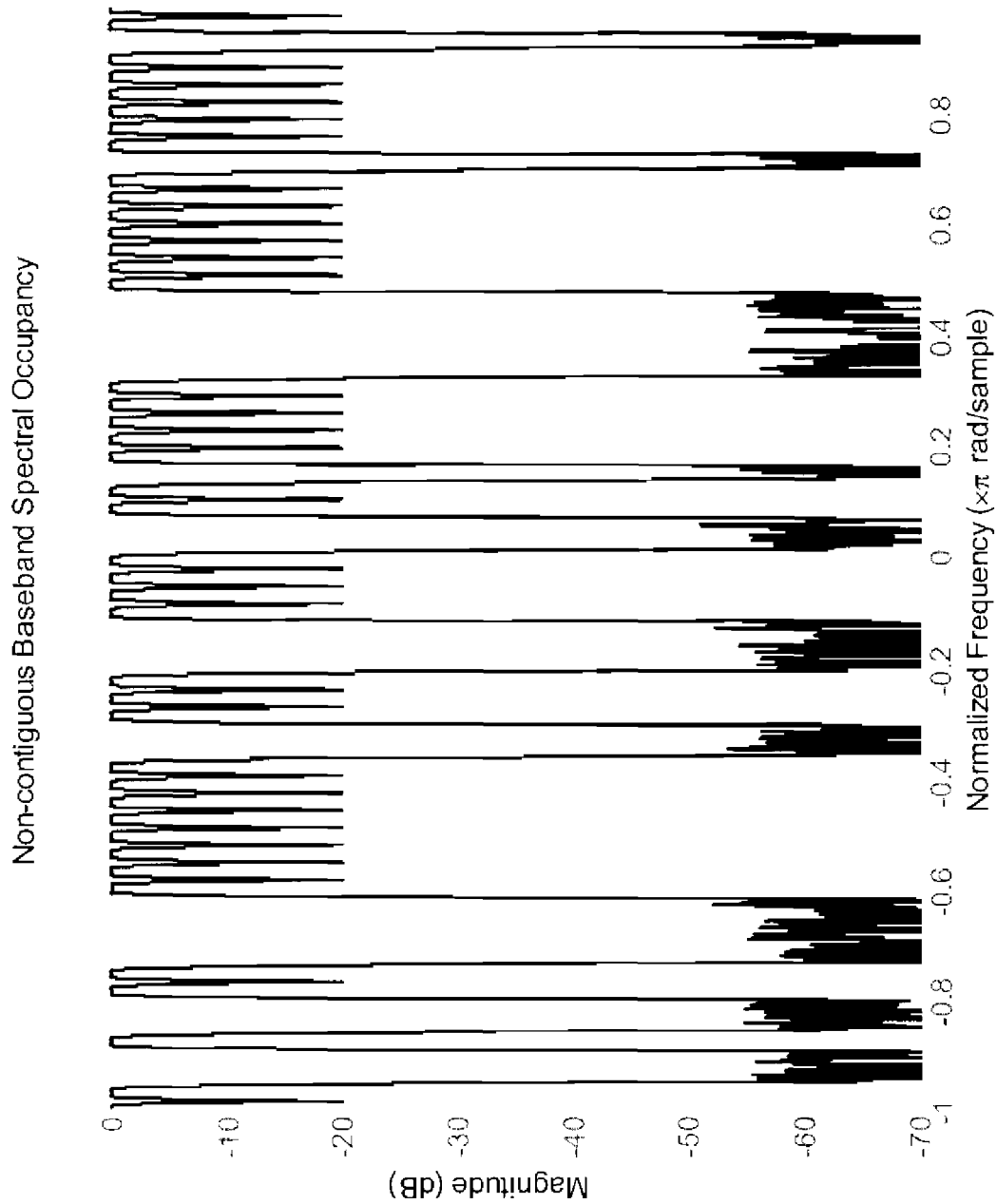
Figure 26: Non-Contiguous Baseband Spectral Occupancy

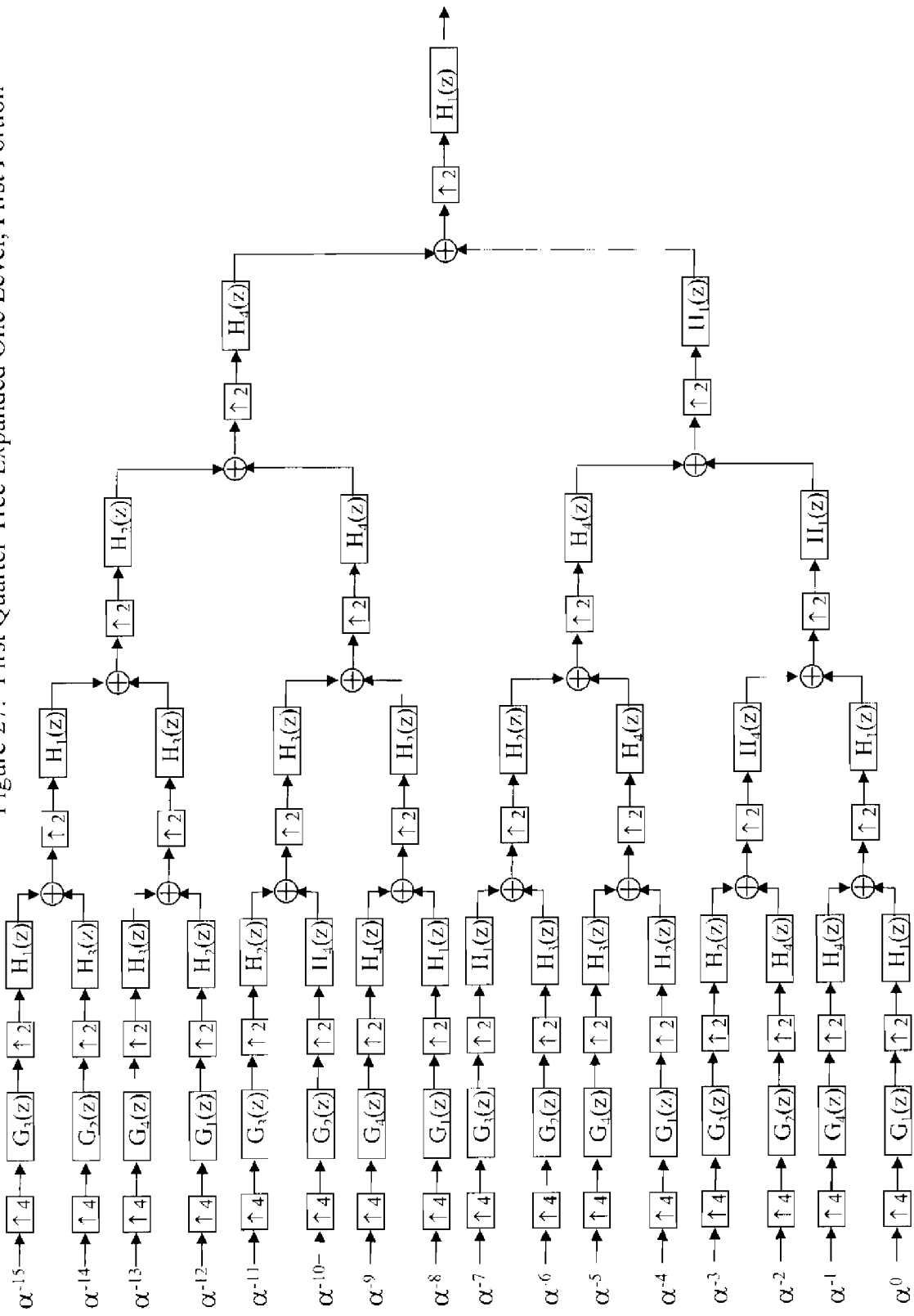
Figure 27: First Quarter Tree Expanded One Level, First Portion

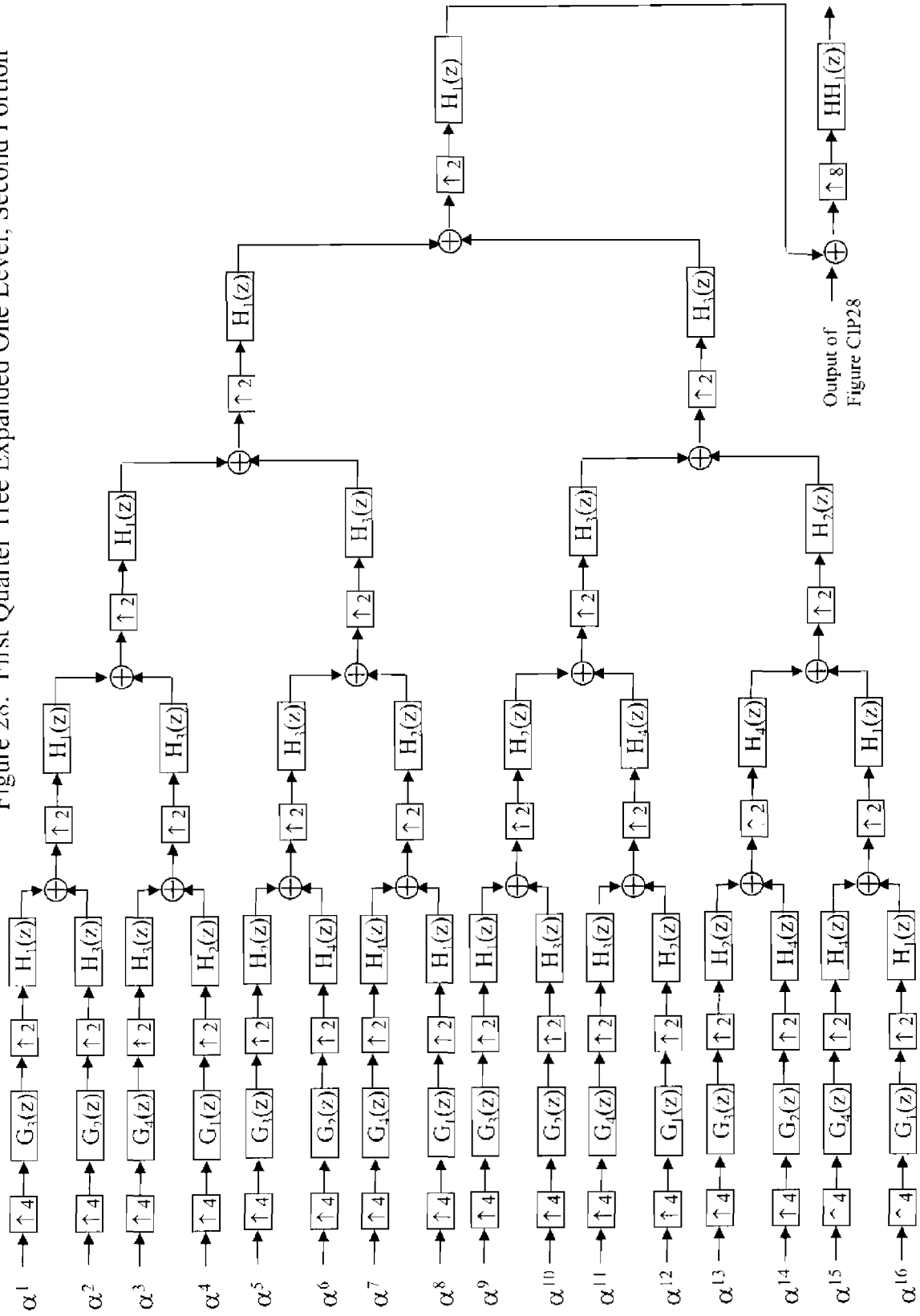
Figure 28: First Quarter Tree Expanded One Level, Second Portion

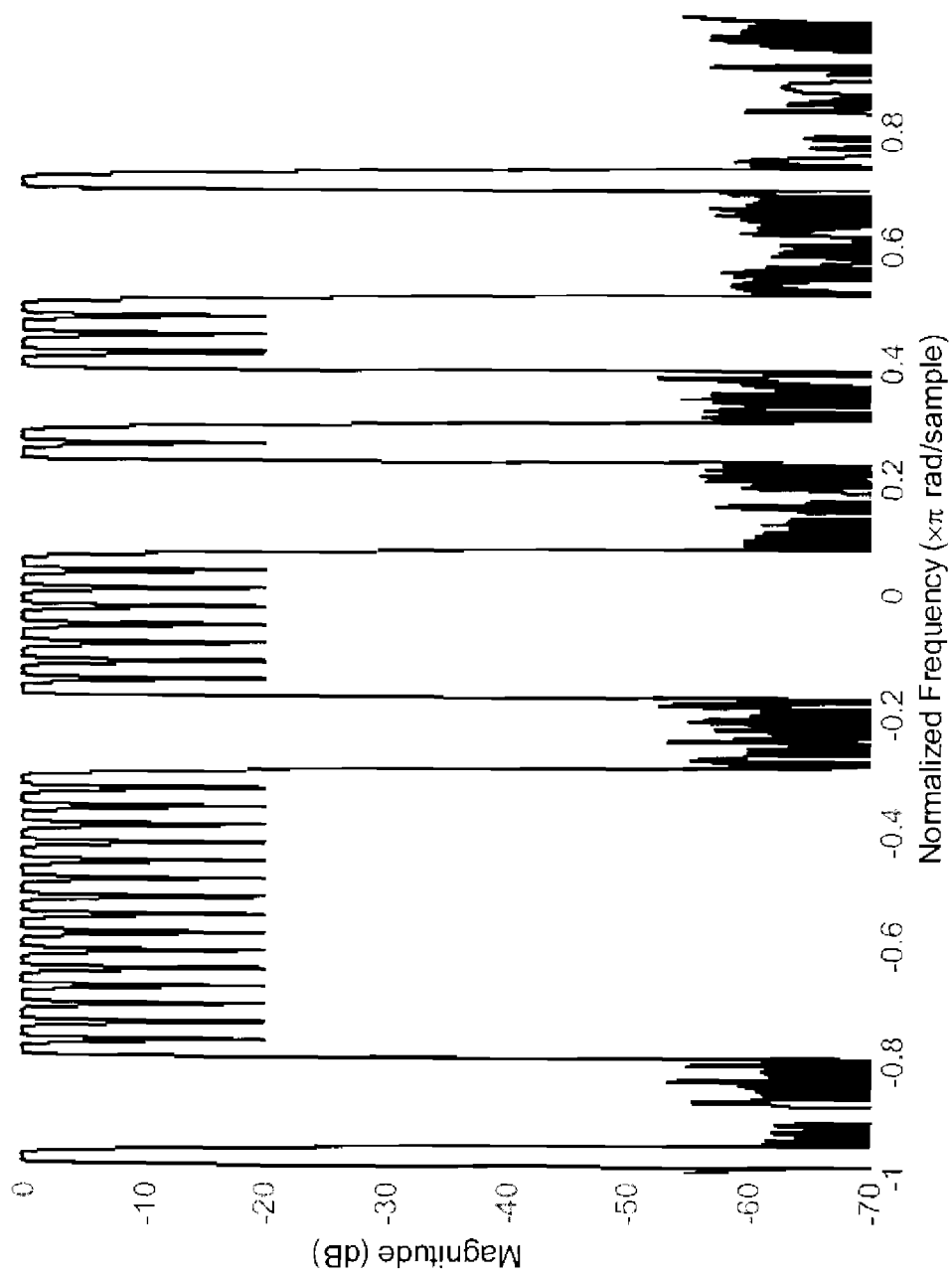
Figure 29. Non-Contiguous Baseband Spectrum With Uniform Subbands

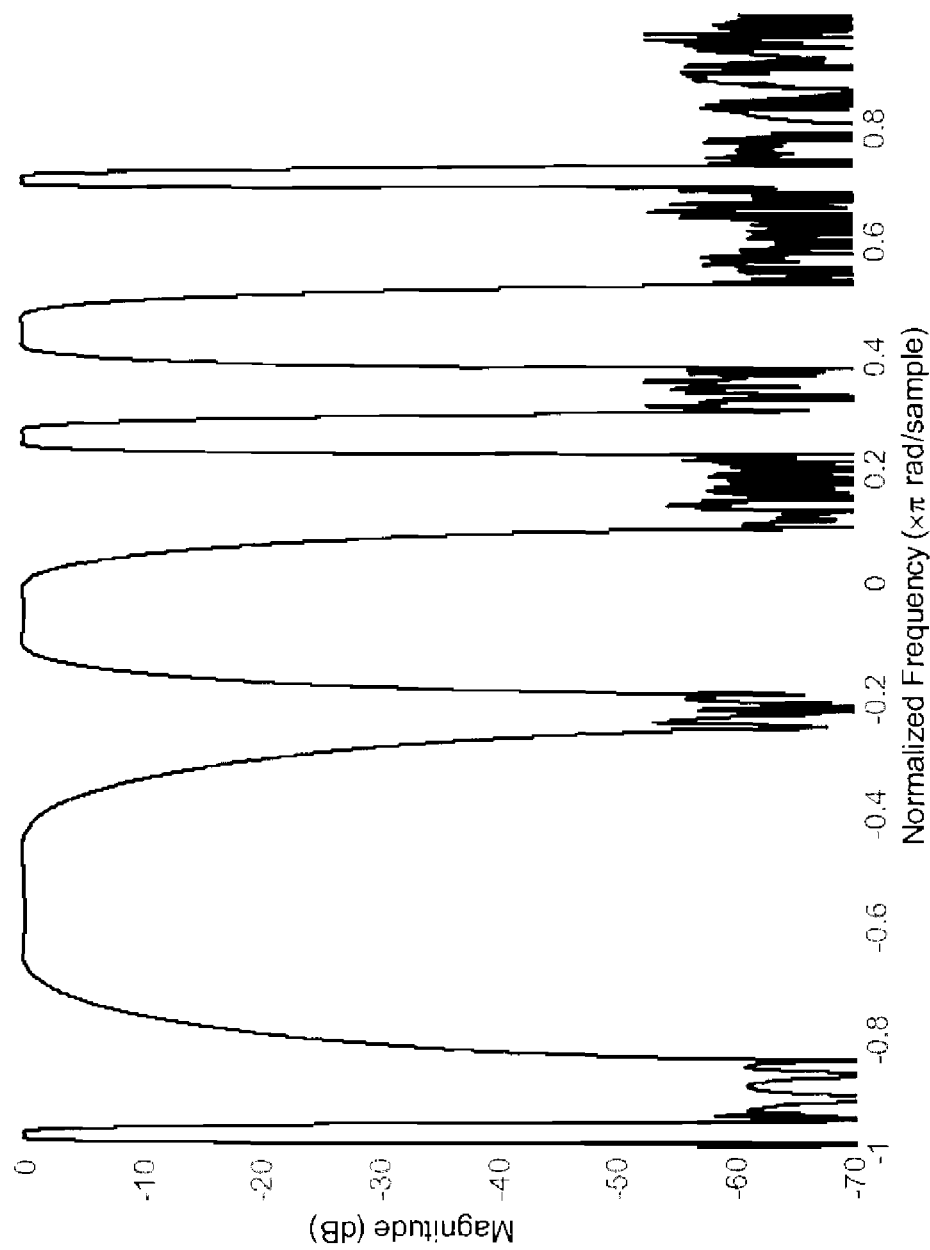
Figure 30. Non-Contiguous Baseband Spectrum With Multiresolution Subbands

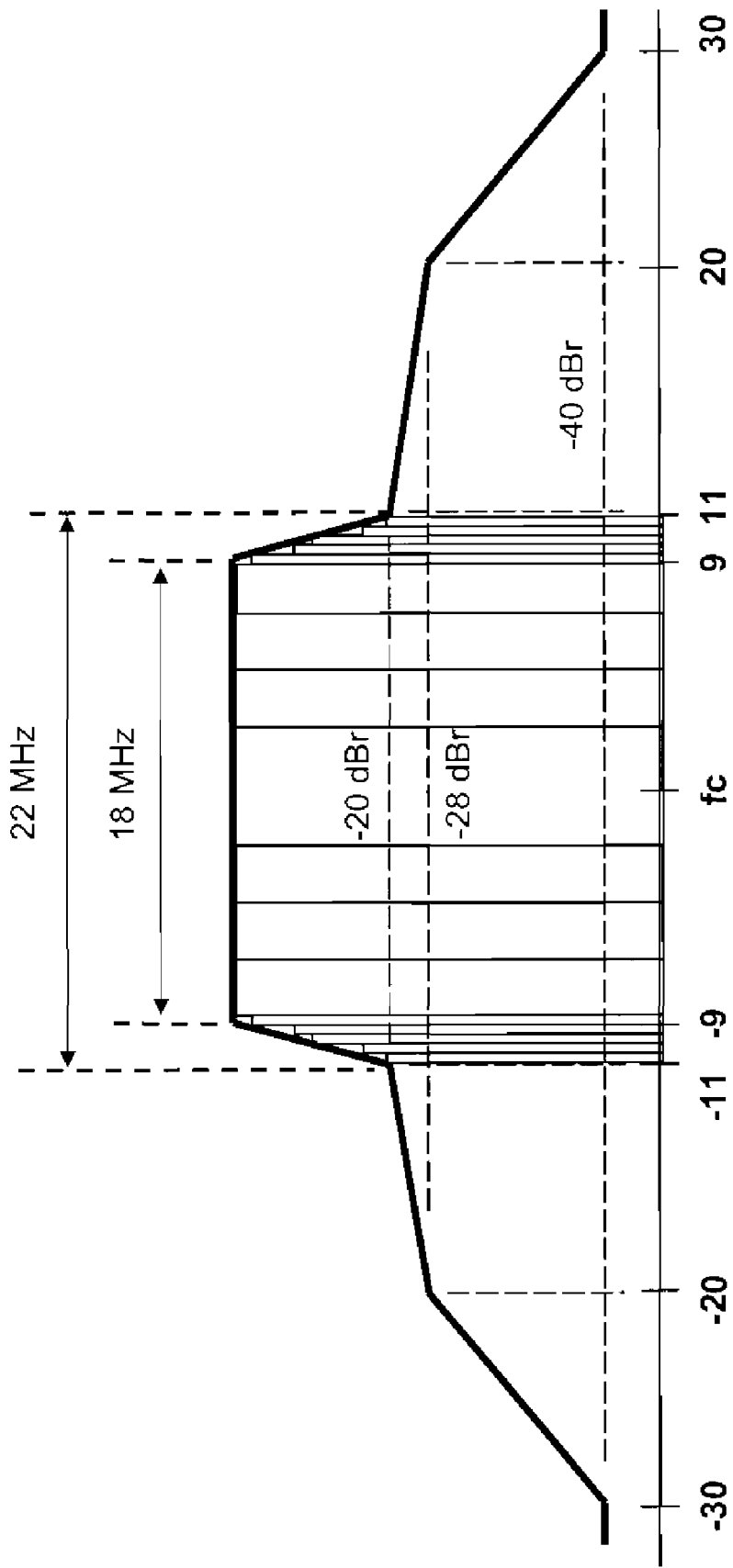
Figure 31. Spectral Mask Shaping Using Subband Weighting

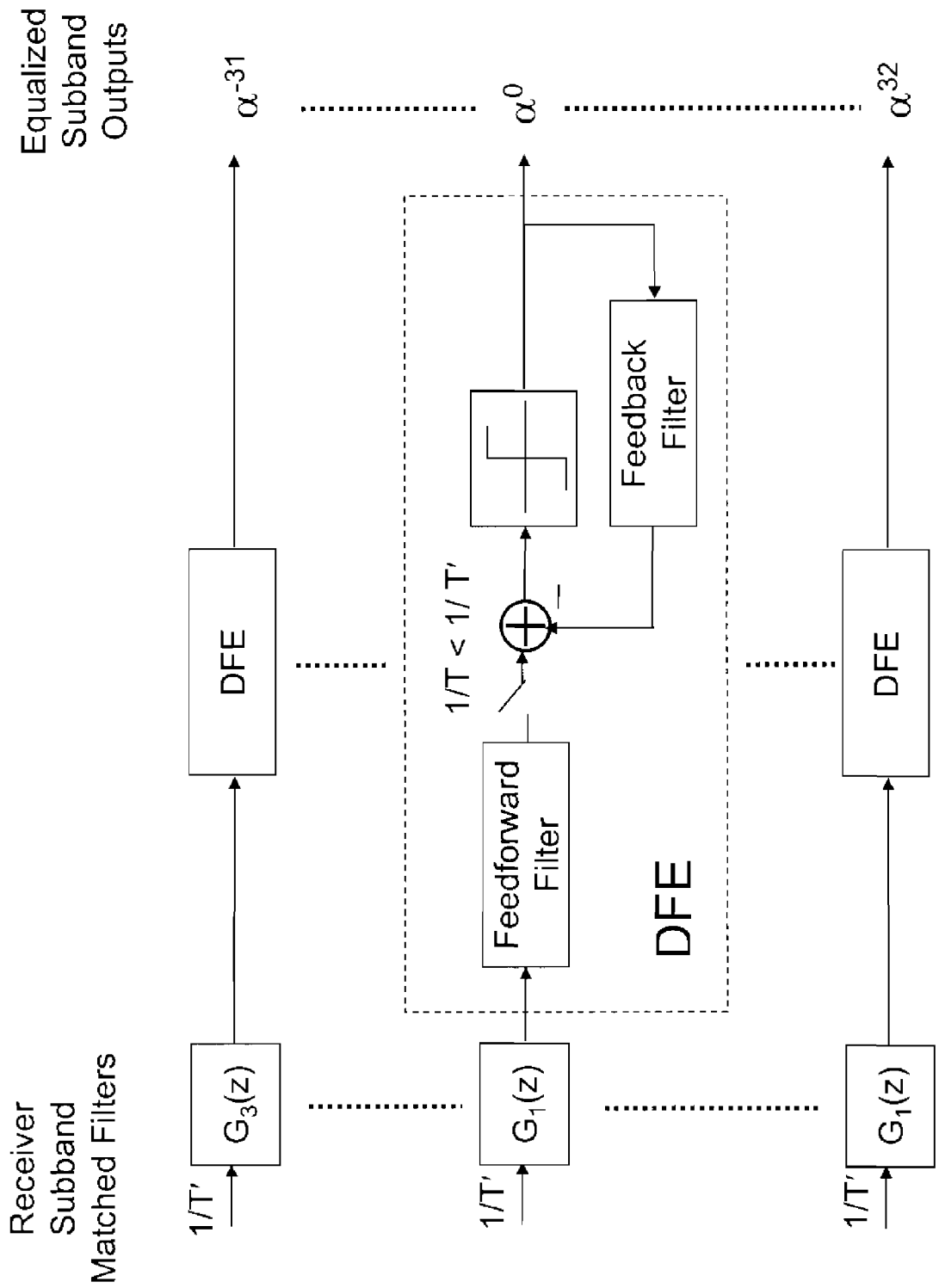
Figure 32: Receive Subband Prototype Filter Equalization

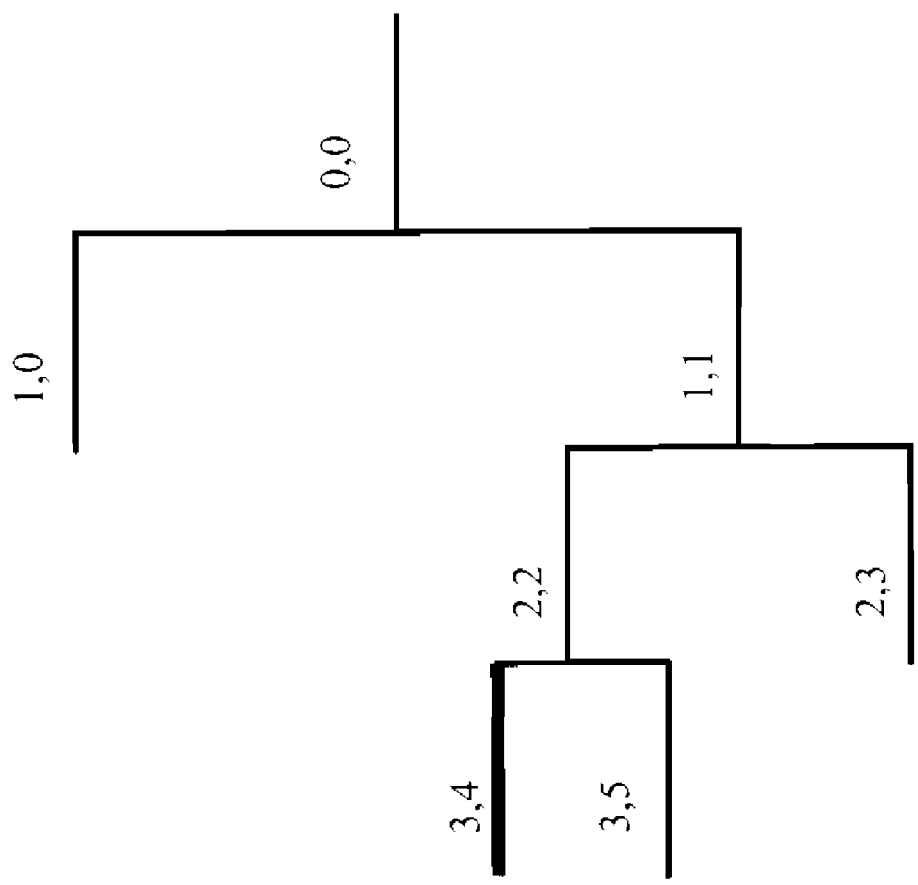
Figure 33: WPM Receive Node Partition Highlighting Control Channel at (3,4)

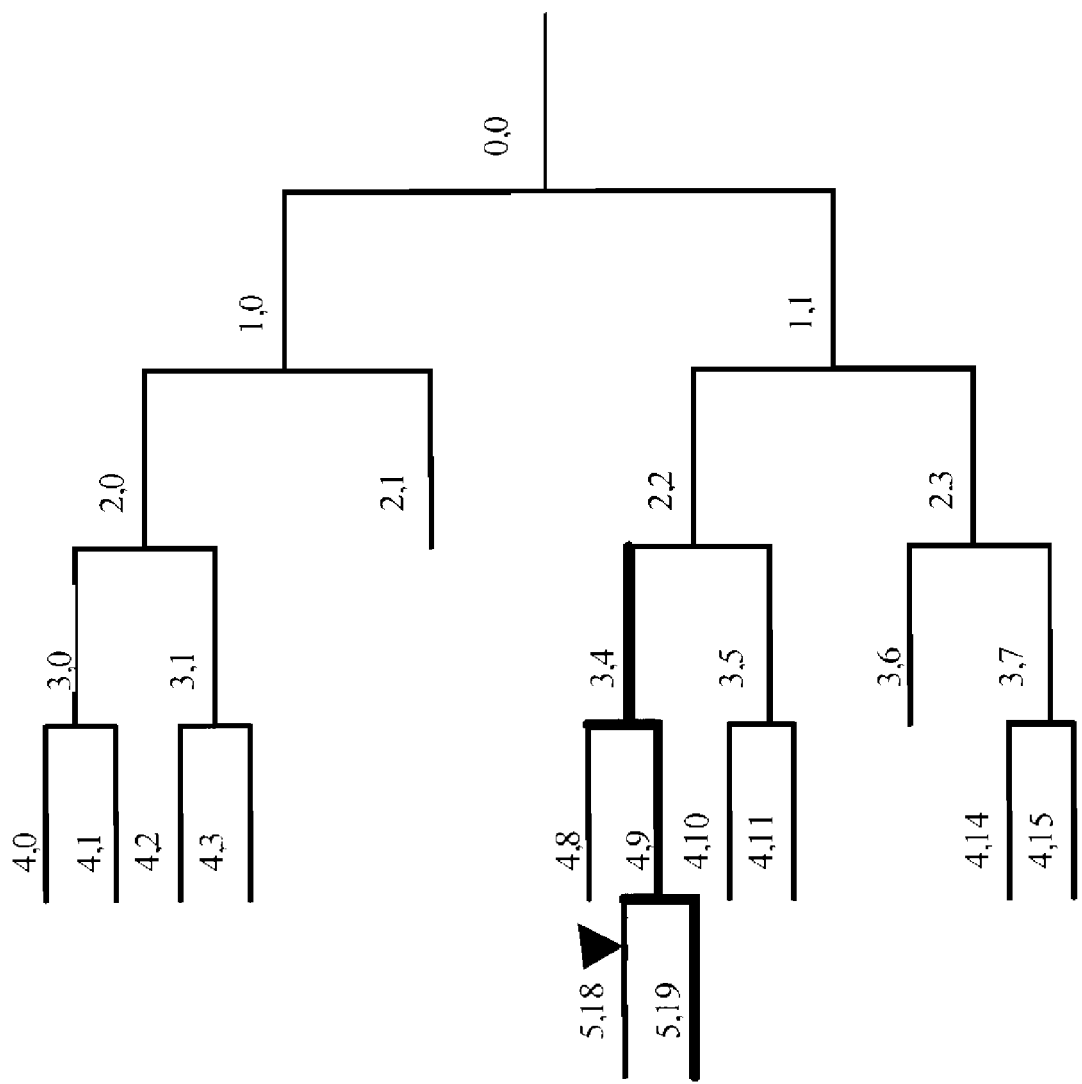
Figure 34: WPM Transmit Node Partition Has Descendant to Control Channel (3,4)

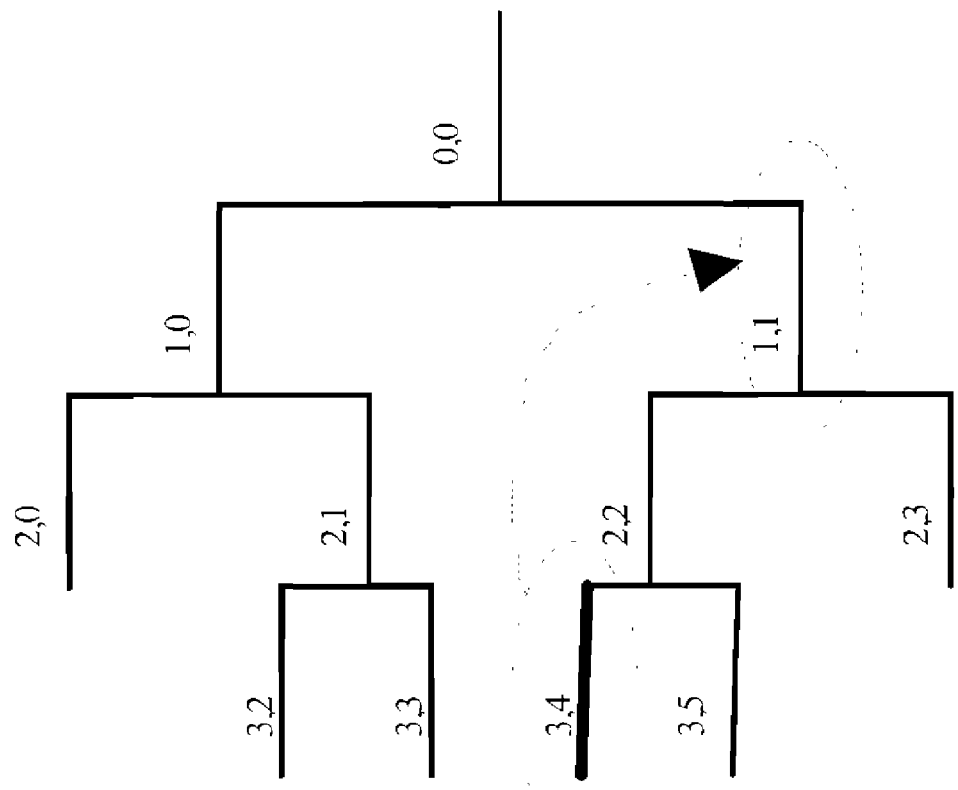
Figure 35: WPM Transmit Node Partition Has Ancestor to Control Channel (3,4)

SYSTEM AND METHOD FOR ORTHOGONALLY MULTIPLEXED SIGNAL TRANSMISSION AND RECEPTION ON A NON-CONTIGUOUS SPECTRAL BASIS

RELATED APPLICATIONS

This application is a continuation in part of U.S. patent application Ser. No. 10/400,834 entitled "System and Method for Orthogonally Multiplexed Signal Transmission and Reception" filed Mar. 27, 2003 now U.S. Pat. No. 7,206,359 (the "'834 application"), which claims priority to U.S. Provisional Patent Application No. 60/368,549 entitled "System and Method for Orthogonally Multiplexed Signal Transmission and Reception" filed Mar. 29, 2002, both of which are incorporated herein by reference.

GOVERNMENT CONTRACT REFERENCE

The U.S. Government has a paid-up license in this invention and the right in limited circumstances to require the patent owner to license others on reasonable terms as provided for by the terms of Army Contract No. DAAH01-01-C-R196 awarded by the DARPA Advanced Technology Office and Contract No. FA8750-05-D-0082 Order 0002 awarded by the Air Force Research Laboratory/Information Directorate.

TECHNICAL FIELD

This invention relates in general to a wireless communication system, and more particularly to a wireless communication system that uses orthogonally multiplexed signal transmission and reception.

BACKGROUND

The volume of multimedia traffic (voice, video, image and data) being transmitted across networks, including wireless communication networks, is increasing. To accommodate the increased volume of multimedia traffic, higher throughput, increased reliability, and more efficient use of limited bandwidth is needed. However, wireless communication networks generally have lower bandwidths, harsher time-varying fading characteristics and higher error rates than wired networks. In addition, in some applications, such as military applications, wireless communication networks also need to protect against intentional interference and provide secure transmissions.

Multicarrier Modulation ("MCM") techniques have been used with wireless communication networks to address these needs. MCM divides a data stream into several parallel streams, each at a much lower bit rate, and then modulates these substreams onto their respective subcarriers (as opposed to the conventional single carrier system). MCM systems include Wavelet Packet Modulation ("WPM") systems, such as that disclosed in the '834 application. WPM combines multidimensional communications principles and wavelet principles into a multirate wavelet-based modulation format for orthogonally multiplexed communications.

The transmit spectra of the wavelet basis set exhibit significant spectral overlap but are orthogonal. Alias cancellation via power complementary Quadrature Mirror Filter ("QMF") pairs at the receiver guarantees perfect signal reconstruction on a lossless channel. By relaxing the perfect reconstruction constraint and reorienting the filter tasking in the dyadic trees, a set of orthogonal basis functions with contiguous compact spectral support similar to a channelized filter bank is possible. The waveform's interference avoidance mechanism is thereby extended to be mutually non-interfering with respect to other signals in the vicinity. This is accomplished via selectable spectral gaps bracketing occupied spectral bands. The waveform variant as disclosed herein for non-contiguous spectral operation is known as an Interpolated Tree Orthogonal Multiplexing ("ITOM") system.

One problem in using WPM or ITOM in a wireless communication network is performing symbol synchronization at the receiver end. Multicarrier modulation systems are particularly sensitive to symbol sampling time offsets because the spectral overlap of the subcarriers can cause significant adjacent channel interference ("ACI") when timing jitter is present. These systems use orthogonal filtering to divide the baseband data into orthogonal frequency subchannels. This process can be thought of as splitting the spectrum of a Nyquist pulse, resulting in subchannels that retain the Nyquist pulse shape (only the period is affected). The transitions between complex symbols that are modulated using conventional Fourier techniques are captured by edge detection techniques that exploit the shape and polarity of the received pulses to determine the optimal sampling instants. WPM and ITOM produce different (dilated) pulse shapes on each subchannel (also referred to as "subband") such that the composite, orthogonally multiplexed signal lacks usable transitions. Inspection of the resultant signal constellation (i.e., eye pattern) after WPM or ITOM reveals a nearly continuous footprint (i.e., closed eye). Thus, there is a need for providing symbol synchronization that does not rely on edge detection.

Channel coding has been used to improve the error handling performance of wireless networks. For an even more potent countermeasure to non-Gaussian interference (non-white noise) sources and channel propagation anomalies, the forward error correction ("FEC") component is distinctly mapped onto the orthogonally multiplexed WPM or ITOM symbols and interleaved to exploit the subband frequency diversity. FEC embodiments may include, but are not limited to, convolutional codes, Reed-Solomon block codes, turbo convolutional and product codes, low density parity check codes, and concatenated code versions (e.g., Reed-Solomon outer code with convolutional inner code).

SUMMARY

The present invention meets the needs described above by providing a wireless communication network which implements Forward Error Correction ("FEC") and Interpolated Tree Orthogonal Multiplexing ("ITOM"), a compact spectral waveform variant that utilizes the dyadic tree structure of the Wavelet Packet Modulation ("WPM") disclosed in the '834 application. The network includes a transmitter that uses an adaptive tree structure. The tree structure facilitates a flexible mapping of the transmit waveform to the available spectrum bandwidth. The network also includes a receiver that implements a maximum likelihood ("ML") synchronization scheme. The synchronization scheme is pulse shape independent and non-data aided.

The transmitter receives a binary input stream and maps the input into a symbol stream using a complex symbol mapper, such as a quadrature amplitude modulation ("QAM") symbol mapper. A demultiplexer divides the symbol stream into a number of parallel streams and an ITOM component outputs an orthogonally multiplexed complex symbol stream. Entering null-valued symbols into the appropriate ITOM component inputs facilitates non-contiguous spectral operation.

To implement error correction, the transmitter includes a FEC encoder and the receiver includes a FEC decoder. The FEC component is mapped onto the orthogonally multiplexed ITOM symbols to counteract non-Gaussian interference sources and channel propagation anomalies. In addition, randomization or permutation can be used to provide additional protection from non-white noise. One example of permutation is interleaving.

The receiver receives the transmitted signal and processes the signal. In particular, the receiver includes an inverse ITOM element that uses the same tree structure used in the ITOM element in the transmitter. The receiver is cognizant of the nulled spectral regions and ignores them when demultiplexing the symbol stream. The receiver also includes a symbol synchronization component. The symbol synchronization component uses an open-loop approach to correct for the time offset seen at the receiver, allowing the synchronizer to be implemented digitally. The key to symbol synchronization is estimating the modulation state transition points to determine the optimal sampling instant. The optimal sampling instant is the instant that mitigates intersymbol interference and captures the peak amplitude of a symbol.

BRIEF DESCRIPTION OF THE DRAWINGS

FIG. 5 is a block diagram of the first quarter of a filter bank tree used in a transmitter in accordance with an embodiment of the invention.

FIG. 6 is a block diagram of the second quarter of a filter bank tree used in a transmitter in accordance with an embodiment of the invention.

FIG. 7 is a block diagram of the third quarter of a filter bank tree used in a transmitter in accordance with an embodiment of the invention.

FIG. 8 is a block diagram of the fourth quarter of a filter bank tree used in a transmitter in accordance with an embodiment of the invention.

FIG. 9 is a diagram illustrating the spectra of the quarter band shaping filters used in a transmitter and a receiver in accordance with an embodiment of the invention.

FIG. 10 is a diagram illustrating the spectra of the lowpass/highpass half band interpolation filters used in a transmitter and a receiver in accordance with an embodiment of the invention.

FIG. 11 is a diagram illustrating the spectra of the positive/negative frequency half band interpolation filters used in a transmitter and a receiver in accordance with an embodiment of the invention.

FIG. 12 is a diagram illustrating the numbering scheme for the bandwidth partitioning on a unit circle diagram for a transmitter and a receiver in accordance with an embodiment of the invention.

FIG. 13 is a diagram illustrating the overlay spectra of a subband for the first stage of processing in a filter bank tree used in a transmitter in accordance with an embodiment of the invention.

FIG. 14 is a diagram illustrating the overlay spectra of a subband for the second stage of processing in a filter bank tree used in a transmitter in accordance with an embodiment of the invention.

FIG. 15 is a diagram illustrating the overlay spectra of a subband for the third stage of processing in a filter bank tree used in a transmitter in accordance with an embodiment of the invention.

FIG. 16 is a diagram illustrating the overlay spectra of a subband for the fourth stage of processing in a filter bank tree used in a transmitter in accordance with an embodiment of the invention.

FIG. 17 is a diagram illustrating the spectra of the subbands spawned for the first quarter band shaping filter used in a transmitter in accordance with an embodiment of the invention.

FIG. 18 is a diagram illustrating the spectra of the subbands spawned for the second quarter band shaping filter used in a transmitter in accordance with an embodiment of the invention.

FIG. 19 is a diagram illustrating the spectra of the subbands spawned for the third quarter band shaping filter used in a transmitter in accordance with an embodiment of the invention.

FIG. 20 is a diagram illustrating the spectra of the subbands spawned for the fourth quarter band shaping filter used in a transmitter in accordance with an embodiment of the invention.

FIG. 21 is a diagram illustrating the spectra of the rate conversion filters of the final stage used in a transmitter in accordance with an embodiment of the invention.

FIG. 22 is a block diagram of the first quarter of a filter bank tree used in a receiver in accordance with an embodiment of the invention.

FIG. 23 is a block diagram of the second quarter of a filter bank tree used in a receiver in accordance with an embodiment of the invention.

FIG. 24 is a block diagram of the third quarter of a filter bank tree used in a receiver in accordance with an embodiment of the invention.

FIG. 25 is a block diagram of the fourth quarter of a filter bank tree used in a receiver in accordance with an embodiment of the invention.

FIG. 26 is a diagram illustrating the transmitter filter bank tree output signal spectra configured for non-contiguous operation in accordance with an embodiment of the invention.

FIG. 27 is a block diagram of the first part of a single level expansion of the first quarter of a filter bank tree used in a transmitter in accordance with an embodiment of the invention.

FIG. 28 is a block diagram of the second part of a single level expansion of the first quarter of a filter bank tree used in a transmitter in accordance with an embodiment of the invention.

FIG. 29 is a diagram illustrating the transmitter filter bank tree output uniform signal spectra configured for non-contiguous operation in accordance with an embodiment of the invention.

FIG. 30 is a diagram illustrating the transmitter filter bank tree output multiresolution signal spectra configured for non-contiguous operation in accordance with an embodiment of the invention.

FIG. 31 is a diagram illustrating spectra that have been shaped using subband weighting in a transmitter in accordance with an embodiment of the invention.

FIG. 32 is a block diagram of fractionally-spaced decision feedback equalization of the detected subband symbols in a receiver in accordance with an embodiment of the invention.

FIG. 33 is a diagram illustrating a transmitter filter bank tree partition with a control channel branch directly available in a receiver filter bank tree partition in accordance with an embodiment of the invention.

FIG. 34 is a diagram illustrating a transmitter filter bank tree partition whereby the receiver filter bank tree partition has an ancestor channel node to the control channel node in accordance with an embodiment of the invention.

FIG. 35 is a diagram illustrating a transmitter filter bank tree partition whereby the receiver filter bank tree partition has descendant channel nodes to the control channel node in accordance with an embodiment of the invention.

DETAILED DESCRIPTION

The present invention is directed to a wireless communication network that implements Forward Error Correction ("FEC") and Interpolated Tree Orthogonal Multiplexing ("ITOM"). Briefly described, the network includes a transmitter that uses an adaptive tree structure. The tree structure facilitates a flexible mapping of the transmit waveform to the available spectrum bandwidth. The network also includes a receiver that implements a maximum likelihood ("ML") synchronization scheme. The synchronization scheme is pulse shape independent and non-data aided. The symbol synchronization scheme uses an open-loop approach to correct the time offset so that it can be implemented digitally.

The ITOM waveform and the mapping and synchronization schemes can be implemented in software code so that they are suitable for "downloading" onto software-defined radios. In addition, the ITOM waveform and the mapping and synchronization schemes are suitable for use in wireless local and metropolitan area networks ("WLANs" and "WMANS") such as networks implementing the IEEE 802.11 and 802.16 standards.

The ITOM baseband process provides a means of mutual non-interference with respect to other signals in the vicinity. The non-contiguous spectral operation capability is not feasible with orthogonal frequency division multiplexing ("OFDM")-based systems because of the inherent poor spectral containment. Transmultiplexer arrangements lack the multiresolution multiplexing flexibility afforded by the dyadic tree structure. The ITOM waveform is adaptable to coexist with other spectral occupants in a manner amenable to Cognitive Radio applications.

Wireless Communication System

Figure 1:
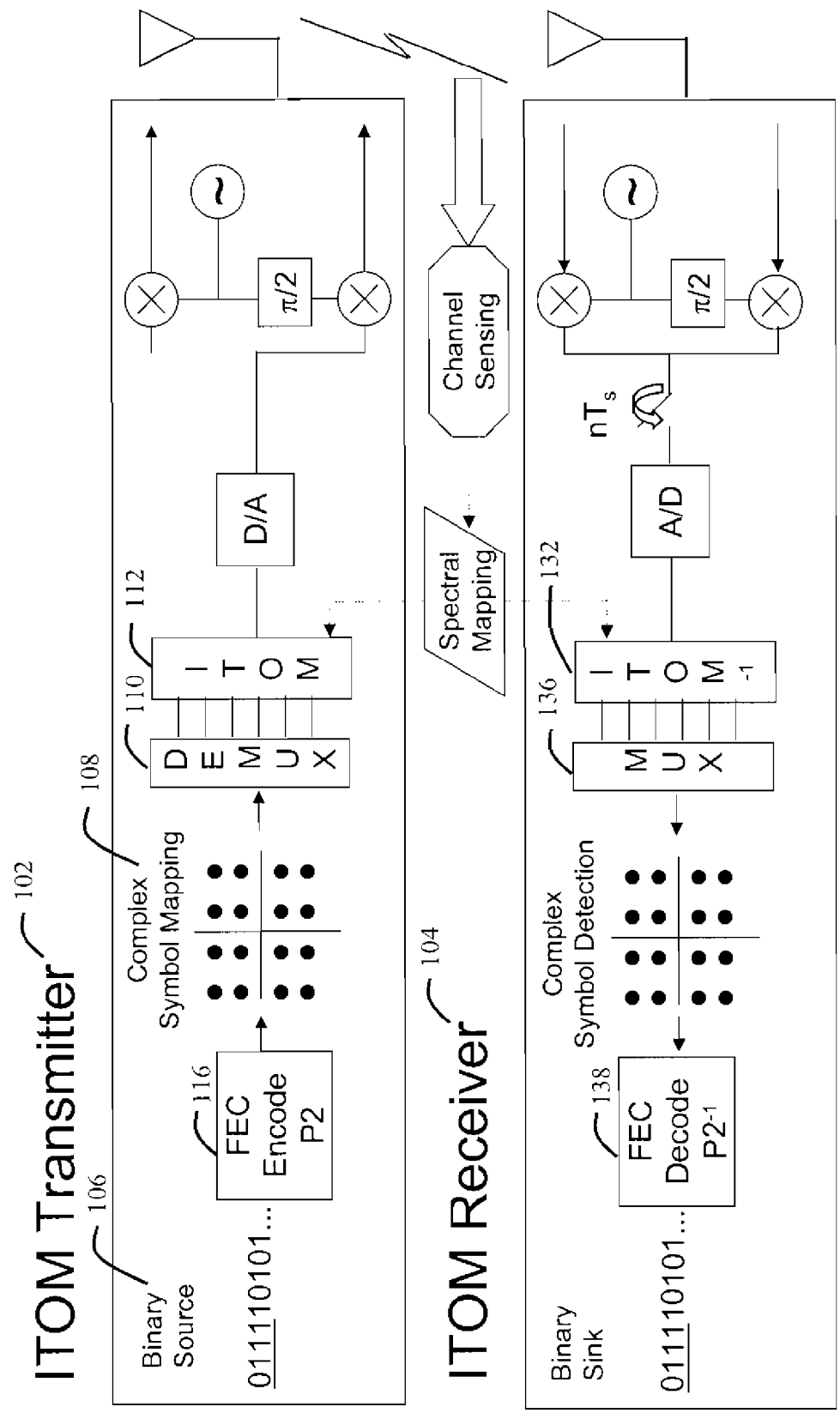
FIG. 1 is a block diagram of a transmitter and a receiver in accordance with an embodiment of the invention.

FIG. 1 illustrates a transmitter 102 and a receiver 104 for use in a wireless communication system in accordance with an embodiment of the invention.

Transmitter

The transmitter receives a binary input stream 106, applies forward error correction encoding and permutation ("P2") 116, and maps the coded bits into a symbol stream using a complex symbol mapper 108. The encoded source bits are preferably mapped to a QPSK or M-QAM complex symbol constellation, whose order "M" is one of the following: 16, 32, 64, or 256. A demultiplexer 110 divides the symbol stream into a number of parallel streams and an Interpolated Tree Orthogonal Multiplexing ("ITOM") component 112 outputs an orthogonal multiplexed complex symbol stream. Pulse shaping for the orthogonally multiplexed complex symbol stream is performed at the filter bank tree branch inputs, within component 112.

The mapped symbol stream is demultiplexed into J parallel channels at appropriate rates. The substreams $\alpha^0, \alpha^1 \ldots \alpha^{J-1}$ are applied to the synthesis process of the ITOM. The detailed operation of the ITOM and inverse ITOM elements is described in the section entitled "Compact Spectral Support Baseband Processing".

The output of the ITOM component is a series of shaped pulses that are logically grouped into a "supersymbol" of duration JT, where J is the number of distinct time-frequency atoms in a supersymbol and T is the period of a single symbol from the source input stream. The shaped pulses are passed through a D/A (Digital to Analog) converter whereby a continuous analog waveform is created.

The analog baseband waveform is admitted to a final processing stage to make it suitable for transmission on a radio frequency ("RF") channel. Dual signal paths are maintained to isolate the real component of the symbol stream from that of the imaginary component. Duplicate, identical ITOM filter banks and pulse shaping components are used to keep the processing separated into two channels. Quadrature multiplexing ("QM") is used to impart the waveform on inphase ("I") and quadrature ("Q") RF carrier signal components using the real and imaginary baseband components, respectively. The QM technique is known in the art and may involve direct conversion to RF or indirect conversion using an intermediate frequency ("IF") stage. Waveform power amplification may be introduced at any point before, during, or after RF upconversion to boost the transmitted signal's range.

Channel

The RF channel propagation characteristics may include Additive White Gaussian Noise ("AWGN") as well as time-dispersive and time-variant anomalies. The pure AWGN channel assumption is valid only for linear time invariant ("LTI") channels such as certain geostationary satellite and microwave line-of-sight ("LOS") channels. The propagation of signals through wireless channels that are time-dispersive results in the transmitted signal arriving at the receiver through multiple paths attributed to reflection, refraction, or diffraction. Multipath propagation results in a received signal that is a superposition of several delayed and scaled copies of the transmitted signal giving rise to frequency-selective fading. The transmitter addresses frequency-selective fading by way of modulating the data stream onto subbands at proportionally lower symbol rates. This has the effect of dilating the duration of the individual symbols within the orthogonally multiplexed supersymbol. By making the symbol rate less than the channel coherence bandwidth, flat fading will predominate.

The transmitter also counters the potential for fast fading due to time-variant Doppler effects from relative motion between the transmitter and receiver. The transmitted symbol rate on each of the subbands is lower bounded by a maximum fade rate. By so doing, the channel parameters appear to be static over several symbols for a more manageable slow fading effect. In practice, the ratio of transmit symbol rate to fade rate is 100:1 or greater to achieve this objective.

An irreducible bit error rate is possible with both fast and frequency-selective fading. This means that a threshold has been reached whereby increasing the signal-to-noise ratio ("SNR") will not yield any further BER benefit. Channel FEC coding reduces the required SNR at the receiver instead of increasing the transmitted signal energy, so the irreducible error floor is effectively lowered. FEC coding, combined with interleaving for a "memoryless" channel, is also the prevalent means of mitigating the net channel attenuation on slow and flat fading channels. The system configuration incorporates a FEC coding and interleaving scheme that exploits the inherent frequency diversity of the waveform.

Receiver

The receiver receives the transmitted signal and processes the signal. The desired signal is downconverted either directly, or via an IF stage, to baseband real and imaginary components using quadrature demultiplexing techniques known in the art. Carrier acquisition and tracking for ITOM can be achieved with techniques known in the art for other MCM schemes such as OFDM. The receiver also includes a symbol synchronization component within element 132. The symbol synchronization component uses an open-loop approach to correct for the time offset seen at the receiver, allowing the synchronizer to be implemented digitally. Details of symbol synchronization are provided in the section entitled "Symbol Synchronization."

On the synchronized baseband signal, the receiver applies an inverse ITOM ("ITOM$^{-1}$") element 132 whose tree structure is matched to the ITOM used at the transmitter. The parallel quadrature amplitude modulation ("QAM") complex symbol outputs of the inverse ITOM element are passed to a multiplexer 136 that converts them to a serial sequence at rate 1/T. The multiplexer output stream is then detected onto a QAM symbol constellation. The QAM symbol decisions are passed to FEC decode and inverse permute ("P2$^{-1}$") element 138 and converted to the original binary source stream.

Symbol Synchronization

Symbol synchronization is performed at the receiver. The key to symbol synchronization is estimating the modulation state transition points to determine the optimal sampling instant. The optimal sampling instant is the instant that mitigates intersymbol interference and captures the peak amplitude of a symbol. However, there is uncertainty at the receiver as to the beginning and end of a transmitted symbol due to the delay between the transmitter and the receiver. The delay includes both static and dynamic components. The static component of the delay is caused primarily by the propagation delay and local oscillator differences at the transmitter and the receiver. The dynamic component of the delay is caused primarily by the time dispersive effects of the channel.

A symbol reaches the receiver after a delay of $nT+\epsilon T$, where T is the transmitter symbol timing scale, n is an integral number of symbol intervals and $\epsilon$ is a fractional portion of a symbol interval. The only reference the receiver has is its own sampling oscillator, free running at period $T_s$. The receiver estimates the delay in terms of its clock, $T_s$, as shown below.

$$(m_n+\mu_n)T_s=(n+\epsilon)T$$

where $m_n$ is an integral number of sampling clocks and $\mu_n$ is a fractional number of sampling clocks. The ratio $T/T_s$ is typically not an integer. Thus, $\mu_n T_s$ is time-variable even though $\epsilon T$ is constant. In addition, the time instants $m_n T_s$ when samples are selected follow an irregular (but deterministic) pattern on the time axis.

The receiver implements a feedforward, maximum likelihood synchronization process that is pulse shape independent and that does not require known synchronization data. One such symbol synchronization process, known as the maximum likelihood decision directed ("MLDD") synchronizer, is disclosed in the '834 application.

A variant of the symbol synchronization algorithm exists that is better suited to burst mode operation as opposed to the optimal continuous mode operation of the MLDD algorithm. This alternate form is also maximum-likelihood, feedforward, and non-data-aided ("NDA"), but is not decision-directed. The maximum likelihood non-data aided ("MLNDA") symbol synchronization algorithm, as it is known, operates on samples out of the receive matched filter. Unlike the MLDD version, the MLNDA symbol synchronization algorithm does not invoke the demodulation and subsequent remodulation functions that form the core of the decision-directed approach. The latencies of the filter bank tree structures are generally intolerable for burst mode operation. In addition to lower latency, the MLNDA algorithm can achieve symbol synchronization without first acquiring carrier phase synchronization. The tradeoff for this simplification is a larger contribution of noise jitter to the timing offset estimate for the MLNDA algorithm. But similar to the MLDD version, the estimation observation window of the MLNDA algorithm can be extended, as limited by the burst duration, to improve accuracy.

Figure 2:
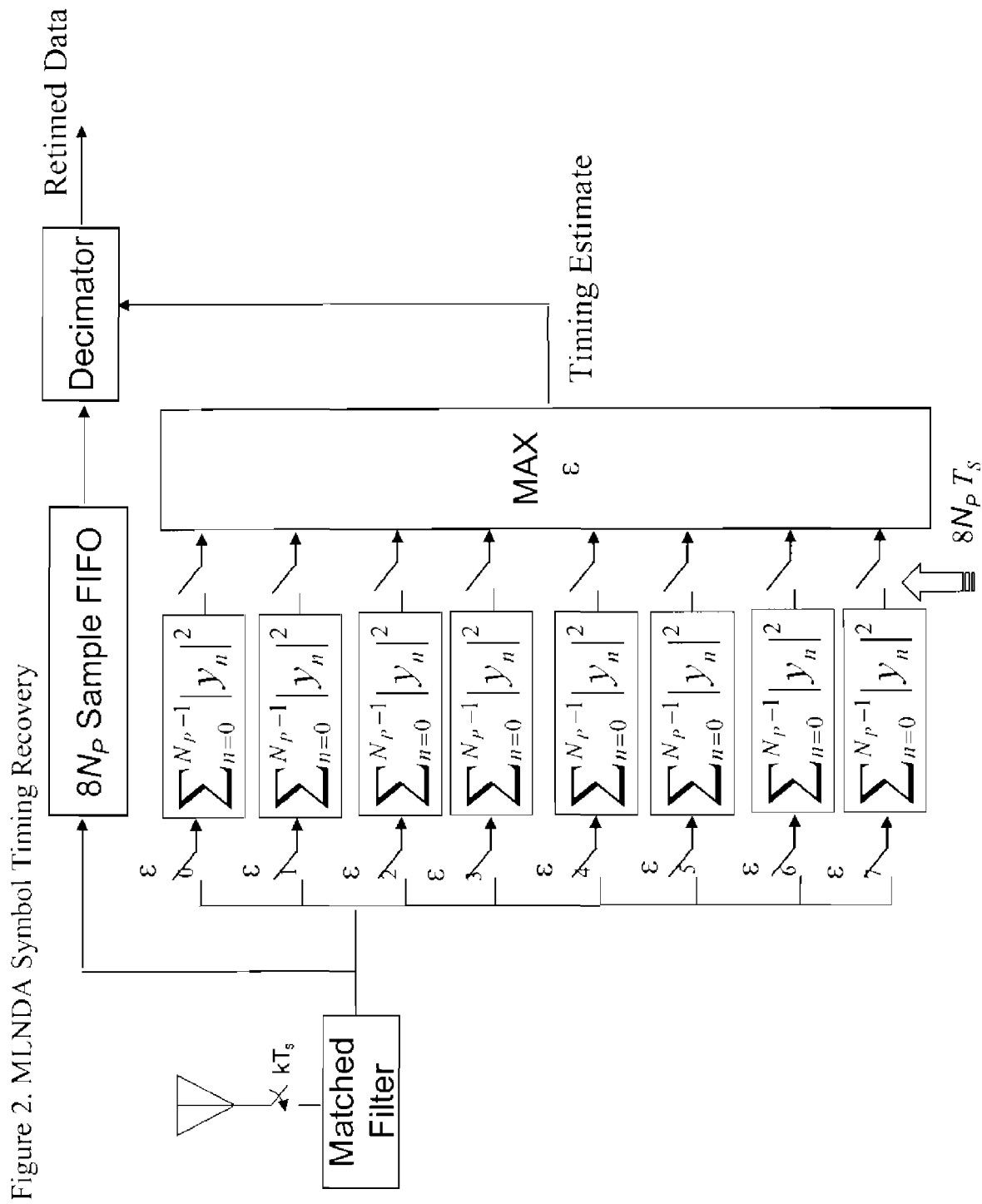
FIG. 2 is block diagram of a symbol synchronizer in accordance with an embodiment of the invention.

The MLNDA algorithm conducts a search for the ML timing parameter, using trial time shift values that correspond to receiver sample clock increments. The timing estimate is derived by maximizing the following log-likelihood function:

$$\Lambda_L(\epsilon)=\Sigma_{n=0}^{N_P-1}|\gamma_n(\epsilon)|^2$$

where $\gamma_n(\epsilon)$ is the $n^{th}$ sample output of the matched filter at offset $\epsilon$. The observation window size $N_P$ can be set to a variable number of WPM pulses. FIG. 2 shows the MLNDA algorithm's operation with the number of samples per ITOM (or WPM) pulse, $N_S$, equal to eight. The first subsampling block extracts only samples at offset $\epsilon_0$ for a total of $N_P$ ITOM pulses for computing the log-likelihood function. The other seven subsampling blocks are used to compute independent log-likelihood functions for the remaining offsets $\epsilon_1$, $\epsilon_2$, $\epsilon_3$, $\epsilon_4$, $\epsilon_5$, $\epsilon_6$, and $\epsilon_7$. Every $N_P$ ITOM pulses, the output of the eight log-likelihood functions is sampled and the sample index corresponding to the maximum is output. Decimation is then applied to the stored $8N_P$ ITOM sample block using the estimated integral downsample index.

Figure 3:
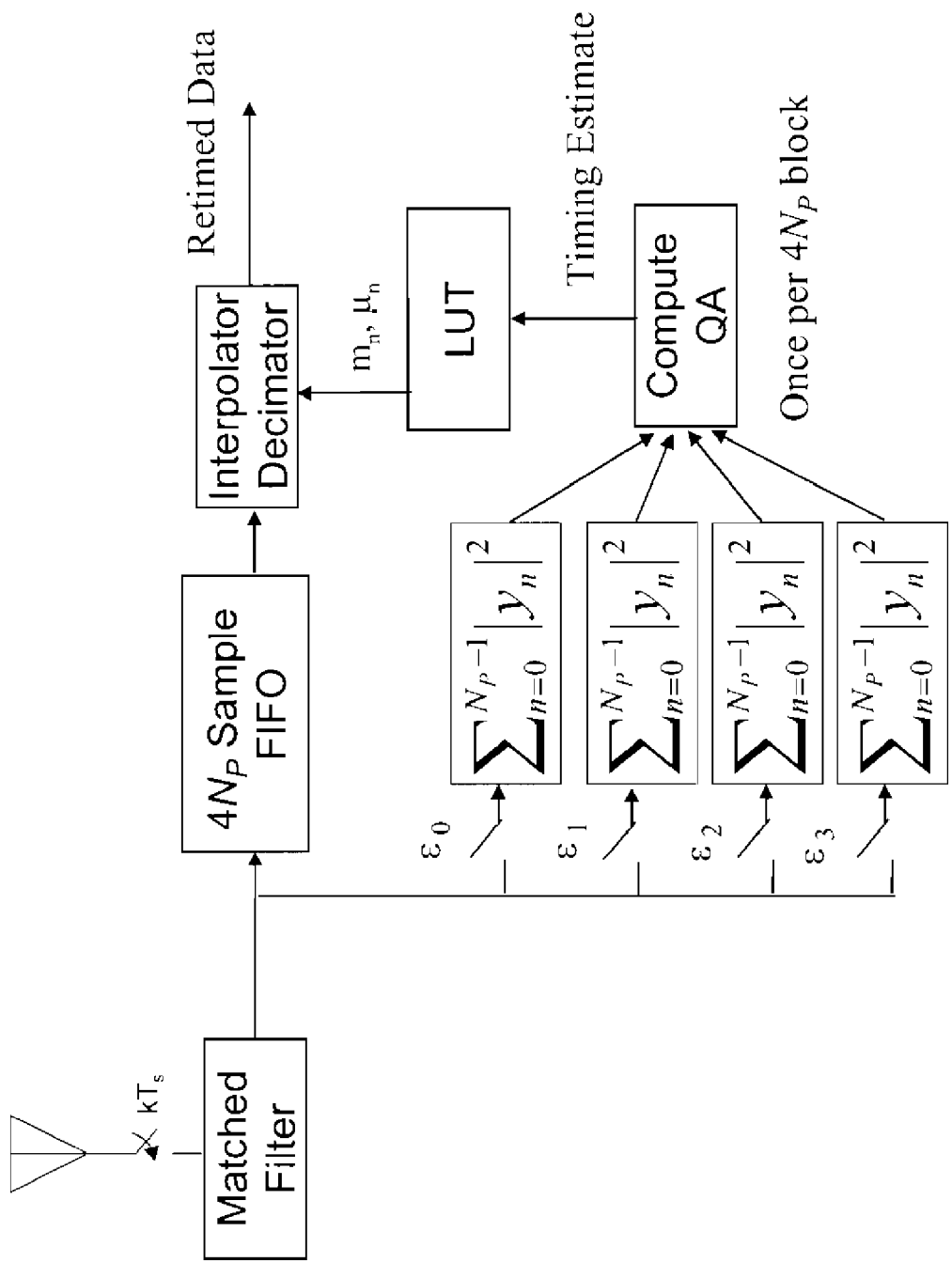
FIG. 3 is a block diagram illustrating the calculation of a quadratic approximation in accordance with an embodiment of the invention.

If $N_S<8$, interpolation functions, such as Farrow structures or other methods known in the art may be employed to create additional sample points. In order to utilize the interpolator, a means of determining the fractional delay component, $\mu_n$, is required. In one embodiment, the quadratic approximation ("QA") algorithm is the computation method for $\mu_n$. FIG. 3 shows how the QA algorithm can be coupled to the MLNDA algorithm to provide interpolation using only four samples per ITOM symbol. The "LUT" block in FIG. 3 represents a lookup table approach to setting the time-variant coefficients of the interpolator according to the computed time estimate.

The preferred receiver sampling rate for the QA algorithm is 4/T, although a 2/T sampling rate coupled with the fixed-time interpolation of two additional samples may be workable if the distortion can be tolerated. Starting with a block of $4*N_p$ receive matched filter symbol samples, four log-likelihood functions are computed for the subset blocks formed by downsampling at the different sample offsets $\epsilon_0$, $\epsilon_1$, $\epsilon_2$, and $\epsilon_3$.

Figure 4:
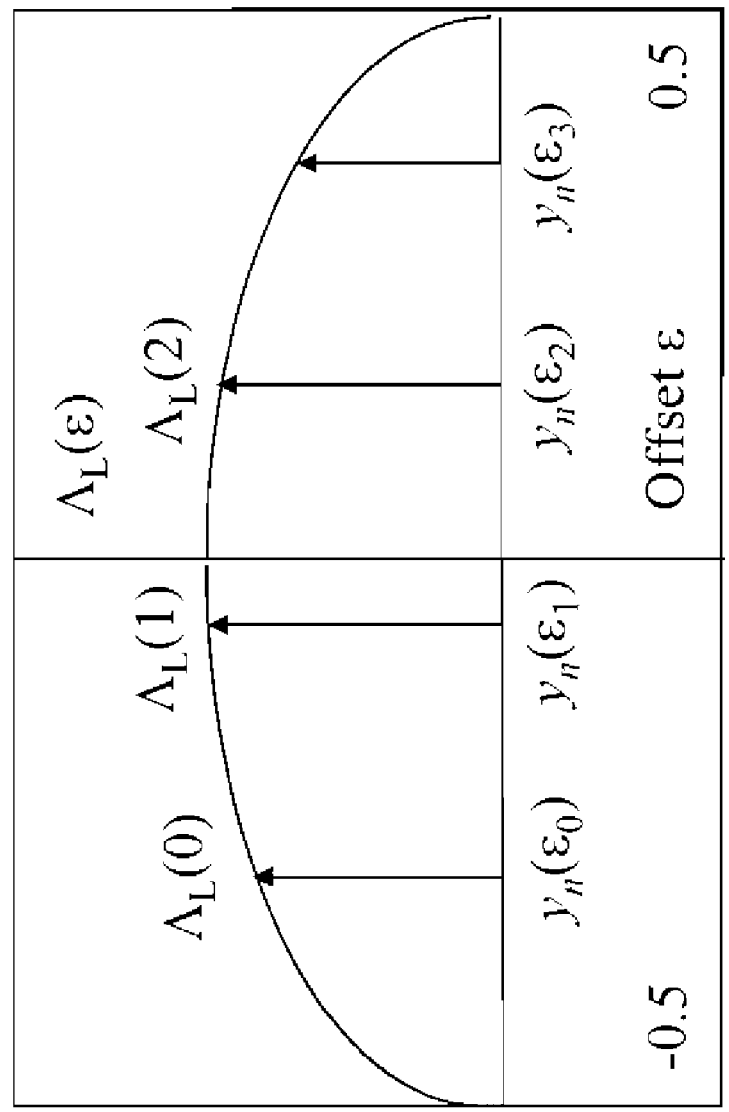
FIG. 4 is a diagram illustrating the fitting of maximum values to a quadratic polynomial curve in accordance with an embodiment of the invention.

After the four log-likelihood functions are computed, the three maximum values of $\Lambda_L$ are used to fit a quadratic polynomial curve, as illustrated in FIG. 4. The timing estimate, incorporating the fractional delay, is the solution for the peak of the quadratic equation:

$$\hat{\epsilon}=\epsilon_0+\left(\frac{3\Lambda_L(0)-4\Lambda_L(1)+\Lambda_L(2)}{2(\Lambda_L(0)-2\Lambda_L(1)+\Lambda_L(2))}\right)\frac{T}{4}$$

The timing estimate then is relative to the first sample offset $\epsilon_0$ in terms of T/4 unit sample offsets.

Compact Spectral Support Baseband Processing

In the WPM synthesis tree configuration, the QMF pairs at each stage perform a dual role of Nyquist signal shaping and of passing/rejecting select spectral regions. In the ITOM waveform variant for compact spectral support, the two tasks of shaping and filtering are reassigned to different sections of the synthesis tree. In this case shaping is performed at the tree branch entry points and spectral replicate filtering occurs after each upsampling stage of the tree. Square Root Raised Cosine ("SRRC") wavelet basis filters can be used for shaping and filtering operations in this embodiment, but do not provide alias cancellation in this case. The relaxation of the perfect reconstruction constraint opens up the possibility of employing Nyquist-type filters with stopband attenuation superior to the standard SRRC formulation. Deviation from perfect reconstruction occurs because the created subbands have less than the Nyquist minimum passband size for zero-intersymbol interference ("ISI") transmission. Therefore the symbol responses within a subband are more overlapped and a degree of controlled ISI is introduced. Fixed decision-feedback equalization may be employed at the receiver filter bank tree output to correct this predetermined ISI resulting from the sub-Nyquist bandwidth filtering.

Four versions of the prototype shaping filter are used at the input branches of the transmit dyadic half-band filter tree, as shown in FIGS. 5, 6, 7, and 8. The filters identified as $G2(z)$, $G3(z)$, and $G4(z)$ are spectrally translated versions of the prototype filter $G1(z)$ residing at multiples of the quarter sample rate. The spectra for one embodiment of these quarter-band shaping filters, a SRRC Nyquist filter variant as described by F. J. Harris, C. Dick, S. Seshagir, and K. Moerder, "An Improved Square-Root Nyquist Shaping Filter," Software Defined Radio Technical Conference, Orange County, Calif., Nov. 14-18, 2005, which is incorporated herein by reference, are shown in FIG. 9. The Finite Impulse Response ("FIR") filters employ 4 samples per symbol to yield band edge overlap points at −20 dB and sidelobes than are 60 dB below the passband to minimize interchannel interference ("ICI"). A multitude of other quarter-band shaping filter designs can be used according to the desired combination of ISI, ICI, and stopband attenuation. Furthermore, the shaping filters are not limited to quarter-band such that divisions such as "eighth-band", "sixteenth-band", and so on are possible embodiments (i.e. the filters are (½$^n$)-band filters, where n is greater than or equal to 2).

As the dyadic tree flows from branch-to-root node, an iterative separation of spectral replicates is performed by a set of modified half-band quadrature mirror filters. The half-band interpolation filters $H1(z)$, $H2(z)$, $H3(z)$, and $H4(z)$ are spectrally shifted to the same center frequencies as the quarter-band filters $G1(z)$, $G2(z)$, $G3(z)$, and $G4(z)$, respectively. The spectra of the lowpass $H1(z)$ and highpass $H2(z)$ filters are shown in FIG. 10. The spectra of the positive frequency $H3(z)$ and negative frequency $H4(z)$ filters are shown in FIG. 11. The interpolation filters in this embodiment are designed for −3 dB band edge overlap points and sidelobes than are 60 dB below the passband. The stopband attenuation of the interpolation filters must be comparable to that of the shaping filters in order to preserve the desired spectral containment of the subbands.

The placement of the half-band interpolation filters in the dyadic tree is intended to exhibit the same sequential interleaving as the input quarter-band shaping filters. FIG. 12 shows the numbering scheme for the bandwidth partitioning on a unit circle diagram. The subbands denoted −31 ... 0 ... +32 on the unit circle correspond to the M-QAM symbol inputs $\alpha^{-31} \ldots \alpha^0 \ldots \alpha^{32}$ on FIGS. 5, 6, 7, and 8. Looking at FIG. 5 beginning at input $\alpha^0$ and proceeding vertically in the first shaping stage of the tree (i.e., counterclockwise direction around the unit circle), the filters are interleaved $G1(z)$, $G3(z)$, $G2(z)$, $G4(z)$, $G1(z)$, $G3(z)$, $G2(z)$, $G4(z)$. This interleaving sequence continues starting at input $\alpha^9$ on FIG. 6, then at input $\alpha^{25}$ on FIG. 7, then at input $\alpha^{-23}$ on FIG. 8, and finally wrapping around at $\alpha^{-7}$ on FIG. 5. Similarly the first interpolation stage of the tree, beginning at the branch corresponding to the input $\alpha^0$, follows a vertical interleaving pattern of $H1(z), H1(z), H3(z), H3(z), H2(z), H2(z), H4(z), H4(z), H1(z), H1(z), \ldots$ that continues through the other quarter-band trees on FIGS. 6, 7, and 8 and wraps back to FIG. 5. The other three interpolation stages follow an identical vertical interleaving pattern.

The creation of an individual subband corresponding to input $\alpha^{-2}$ is illustrated in FIGS. 13, 14, 15, and 16. FIG. 13 shows the output of the $G2(z)$ shaping filter that has been upsampled (i.e., zero packed), creating a spectral replicate. The dashed curve indicates the spectral response of the subsequent $H4(z)$ filter that rejects the image response. FIGS. 14 and 15 show the interpolation iterations occurring in the second and third stages, respectively. FIG. 16 shows the final subband output from the fourth interpolation stage.

All of the 64 subbands created in this embodiment are traceable back to one of the shaping filters. FIG. 17 shows the subbands spawned from quarter-band filter $G1(z)$. FIG. 18 shows the subbands spawned from quarter-band filter $G2(z)$. FIG. 19 shows the subbands spawned from quarter-band filter $G3(z)$. FIG. 20 shows the subbands spawned from quarter-band filter $G4(z)$.

The final stage for each of the quarter-band trees is comprised of the $HH1(z)$, $HH3(z)$, and $HH4(z)$ filter types. The purpose of these filters is to perform sample rate conversion to a higher rate to assist timing recovery at the receiver. The sample rate upconversion is conducted prior to, rather than after summing the quarter-band tree outputs. This processing order is chosen because the critically-sampled system provides no allowance for replicate separation once the bandwidth is filled in completely by summing the quarter-band trees. FIG. 21 shows the spectra of one embodiment of the $HH1(z)$, $HH3(z)$, and $HH4(z)$ filters. Other embodiments known in the art are possible, including multirate cascade upconversion filters and Cascaded Integrator Comb (CIC) upconversion filters.

At the receiver, a complementary dyadic tree decimation process is invoked to separate the multiplexed M-QAM symbols, as shown in FIGS. 22, 23, 24, and 25, respectively. Although a distinct initial $HH1(z)$ filter stage appears in each of these figures, it is actually a single filter that provides the root to these quarter-band trees. The $HH1(z)$ filter is matched to oversampled transmit signal. The output of the $HH1(z)$ filter is downsampled according to the symbol synchronization technique to once again obtain a critically-sampled signal prior to subsequent demultiplexing.

The transmitter filter bank dyadic trees shown in 5, 6, 7, and 8 encompass one embodiment of the processing for block 112 in FIG. 1. The receiver filter bank dyadic trees shown in 22, 23, 24, and 25 encompass one embodiment of the processing for block 132 in FIG. 1.

The transmitter can be configured for a non-contiguous spectral operation by inputting zero-valued symbols at the desired locations in the set $[\alpha^{-31} \ldots \alpha^0 \ldots \alpha^{32}]$. For example, FIG. 26 shows the baseband transmit signal spectra (without the final sample rate upconversion stage for the sole purpose of visual clarity), with null values input to the following node clusters: $[\alpha^{-30}, \alpha^{-29}]$; $[\alpha^{-27}, \alpha^{-26}]$; $[\alpha^{-23}, \alpha^{-22}, \alpha^{-21}, \alpha^{-20}]$; $[\alpha^{-11}, \alpha^{-10}]$; $[\alpha^{-6}, \alpha^{-5}, \alpha^{-4}]$; $[\alpha^1, \alpha^2]$; $[\alpha^5]$; $[\alpha^{11}, \alpha^{12}, \alpha^{13}$, $\alpha^{14}$, $\alpha^{15}$]; [$\alpha^{23}$]; [$\alpha^{30}$]. A total of nine spectral gaps are the result, varying in width from one to five subbands. A multitude of patterns of nulled spectral regions is possible. Similar to the conveyance of the tree pruning configuration, the receiver is made aware of the locations of vacant subbands and ignores them during the demodulation process. Input buffering of the transmit source symbol stream provides for bypassing the data to active subbands so that no dropouts occur.

Finer resolution for transmit spectral mask control is obtainable by expanding the dyadic half-band filter bank tree. Each additional tree level reduces the minimum spectral increment—the subband—by half. Expansion is accomplished by inserting the new tree level prior to the final sample rate upconversion stage of the quarter-band trees (i.e., before the HH1($z$), HH3($z$), and HH4($z$) filters). Each inserted tree level follows the established vertical interleaving pattern of H1($z$), H1($z$), H3($z$), H3($z$), H2($z$), H2($z$), H4($z$), H4($z$), H1($z$), H1($z$), . . . filters. For example, FIGS. 27 and 28 show the modified first quarter of the full tree of FIG. 5 with one additional level. The first quarter-band tree, as well as the other three quarter-band trees, now account for 32 subband inputs out of 128 total subbands. The source symbol rate at the dyadic half-band tree branch inputs is halved for each additional tree level. Each tree level inserted on the transmit side is mirrored by an identical filtering level (with decimation instead of interpolation) on the receive side.

The dyadic filter bank tree structure allows the merging of adjacent occupied subbands. The tree is pruned by bypassing one or more interpolation stages to replace a cluster of narrower subbands with a single, wider subband. FIG. 29 shows a non-contiguous transmit baseband spectrum created using the structures shown in FIGS. 5, 6, 7 and 8. FIG. 30 shows a non-contiguous transmit baseband spectrum that provides an equivalent bandwidth efficiency with respect to FIG. 29. The throughput afforded by either arrangement will be the same on a non-distorted channel. However, the aggregation that occurs in FIG. 30 provides selectable spectral width subband conduits to combine multirate user streams on a single transmit channel. Support for multiresolution is also inherent in the WPM embodiment as discussed in the '834 application. Transmultiplexer arrangements, such as Filtered Multitone ("FMT") (see e.g. U.S. Pat. No. 6,665,349, granted Dec. 16, 2003 to Cherubini et al., entitled "Filtered Multitone Transmission Application to DSL Technologies"), lack the non-uniform subband multiplexing flexibility afforded by the dyadic tree structure.

The non-contiguous spectral adaptation has application in enabling mutually non-interfering, possibly non-cooperative, co-channel operation with other signals. For example, in one embodiment the transmitter can perform channel sensing by determining the spectral occupancy of external signals in the channel and can adapt the filter bank tree structure so that the transmitted signals coexist on a non-interfering basis with the external signals. Another embodiment applies scalar weights to the branch symbol inputs, rather than exclusively null values, for a finer precision shaping of the transmit signal spectrum. Waveforms that use the public airwaves, such as those applicable to IEEE 802.11 wireless local area networks, must comply with the defined regulatory channel spectral masks. The variable subband resolution can be exploited, for example, by placing very narrow subbands with a sloped attenuation on the channel passband skirts to squeeze in additional channel capacity. FIG. 31 shows an example of this concept for using bandwidth beyond the nominal 18 MHz passband of the IEEE 802.11a spectral mask, with attenuated subbands extending an additional 4 MHz. At the receiver, the reciprocals of the transmitter subband weighting factors are applied to the demultiplexed subband outputs. In this manner, the skirt subbands undergo a fixed amplitude equalization that translates the contained symbols to the proper detection decision regions.

For dense, higher-order M-QAM input constellations, the level of controlled ISI introduced by the sub-Nyquist filter bandwidths may be sufficient to cause erroneous symbol decision boundary crossings on a lossless channel. To overcome this issue, decision-feedback equalization ("DFE") can be applied independently to each of the subband outputs. As an example, FIG. 32 shows the incorporation of DFE for the example set of 64 subbands. As known in the art, the DFE consists of feedforward and feedback filter sections. The linear transversal filter utilized in the feedforward section seeks to coherently combine all of the current symbol's energy. The purpose of the feedback section is to remove the energy of previously detected symbols. Because the ISI distortion due to the imperfect prototype filter design is known, the coefficients for both filter sections can be computed in advance and require no adaptation. Moreover, the same set of fixed coefficients can be shared amongst the subband decision feedback equalizers for implementation efficiency. FIG. 32 depicts the feedforward section with a fractionally spaced FIR filter arrangement. Because the feedforward section is placed before the final downsampling unit, the equalizer can take advantage of the oversampled baseband symbols for better timing offset tolerance. In the example embodiment, the oversampling rate 1/T' corresponds to four times the symbol rate or 4/T. However, the feedforward section can also be located after the decimation for a symbol-spaced tap implementation of the FIR filter.

Scalable Waveform for Channel Intersymbol Interference Control

For OFDM-based wireless networks, the cyclic prefix is a necessity to absorb the residual delay spread, thereby jointly eliminating ISI and interchannel interference ("ICI") as long as the cyclic prefix is longer in duration than the delay spread. The ICI caused by the weak subchannel filtering (i.e., 13 dB sidelobe suppression of the inverse FFT) of OFDM is resolved by the cyclic prefix turning the channel multipath effects into a circular convolution. The multipath distortion can be overcome and the original signal restored with a simple one complex tap per subchannel equalizer after the FFT. For example, an IEEE 802.11a/g OFDM-based wireless local area network allows for either a 400 or 800 nanosecond long cyclic prefix. For an indoor network, the typical deployment setting for these WLANs, the cyclic prefix duration is sufficient to mitigate ISI. However, even the longer of these two guard periods is grossly inadequate to contain the maximum excess delay spreads experienced on outdoor urban channels where the delay spread is on the order of microseconds. Such a network will fail in these circumstances even though provisions include an equalizer. Extending the cyclic prefix is a possible solution, but results in throughput reduction proportional to the additional overhead that carries no data.

ITOM and WPM overlap the symbols in time by design and there is no room for a cyclic prefix. It is readily apparent that the multipath echoes can smear symbols together in the individual subbands and cause distortion through the loss of orthogonality in the time domain. The decimation in the receive side filter bank tree discards the extra samples needed to restore orthogonality lost to the channel phase distortion. Techniques such as time domain equalizers (i.e., equalize before the filter bank) can address this problem by shortening the channel response on wireline systems (such as filter bank based digital subscriber lines—"DSL") and for fixed (or low mobility) indoor WLANs. However, for the majority of outdoor mobile systems, the radio channel is far too dynamic for this approach to be effective due to the slow convergence of equalizer taps. The recommended strategy is to keep subdividing the bandwidth and commensurately lowering the subband symbol rate until the ISI becomes negligible, without requiring supplemental equalization.

One embodiment entails scaling the number of filter bank levels in proportion to the system bandwidth in order to maintain a constant subband size. The wireless link is designed to accommodate a threshold maximum value for the RMS delay spread on the communications channel. The RMS delay spread can then be used to approximate the channel coherence bandwidth ($f_0$). The coherence bandwidth yields the range of frequencies over which the channel passes all spectral components with approximately equal gain and linear phase. The subband size needs to be no larger than the coherence bandwidth to ensure that the channel-induced ISI distortion is negligible. The coherence bandwidth does not have an exact relationship with the delay spread. The applicable definition for the WPM or ITOM waveform is the frequency interval over which the channel's complex frequency transfer function has a correlation $\geq 0.9$:

$$f_0 \approx \frac{1}{50\sigma_\tau}; \quad 90\% \text{ coherence bandwidth}$$

For example, say a channel RMS delay spread up to 2 microseconds is possible in an urban mobile environment. The 90% coherence bandwidth is then 10 kHz. The subband size needs to be less than 10 kHz. The following table shows how a constant subband size of approximately 9.765 kHz can be achieved for a varying system bandwidth:

TABLE 1

| Parameters | Values | | | | |
|---|---|---|---|---|---|
| System Bandwidth | 625 kHz | 1.25 MHz | 2.5 MHz | 5 MHz | 10 MHz |
| No. Input Subbands | 64 | 128 | 256 | 512 | 1024 |
| Subband Size | 9.765 kHz | | | | |

The system bandwidth can thus be efficiently scaled according to application needs while guaranteeing a consistent level of channel ISI protection. Moreover, this performance is achieved without either the assistance of a capacity-wasting guard interval or that of a complex adaptive time-domain equalizer.

The adaptive loading mechanisms known in the art for multicarrier modulation systems can also be applied here for enhancement of throughput or robustness on multipath channels. The channel attenuation per subband can be determined by embedding known symbols in the frequency acquisition preamble. In one embodiment, the transmit power can be distributed amongst the subbands accordingly to pre-compensate the weaker subbands. In addition to adaptive power loading, the subband channel attenuation values can be used to perform adaptive bit loading. In this embodiment, the input M-QAM source constellation density is variable across the subbands. For instance, weaker subbands are assigned QPSK source constellations whereas stronger ones are assigned 16-QAM source constellations.

Secure Waveform

The WPM waveform and its ITOM variant have an inherent low probability of exploitation ("LPE") as a result of the orthogonal multiplexing of the M-QAM source symbols. The transmit complex-valued output symbols have cardinality $$N_b = 2^{KL^J}$$

where K is the number of bits per symbol in the source M-QAM constellation, L is the length of the constituent filters of the synthesis and analysis trees, and J is the number of input subbands in the transmit filter bank tree. For an embodiment using a QPSK constellation, 15-tap SRRC QMFs, and a 8-subband filter bank tree, the output sequence can take on any of $2^{(2)(15)(8)} = 2^{240} > 10^{99}$ possible values for a virtually continuous output constellation. The waveform's statistics are approximately Gaussian making it very difficult to differentiate it from the background channel noise. A comparison table of statistical moments of a Gaussian signal versus a WPM signal is tabulated below:

TABLE 2

| | Moment | | | | | | |
|---|---|---|---|---|---|---|---|
| Signal | 1 | 2 | 3 | 4 | 5 | 6 | 7 |
| Gaussian | −0.0010 | 0.0554 | −0.0002 | 0.0093 | −0.0001 | 0.0025 | −0.0001 |
| WPM | −0.0010 | 0.0554 | 0.0011 | 0.0108 | 0.0010 | 0.0030 | 0.0006 |

Although any or all of the three parameters above can be varied to further enhance LPE characteristics, the flexible tree structure directly promotes dynamic adaptation of number of input subbands—parameter J. Tree pruning alters the time-frequency partitioning of input subbands in a plurality of combinations. Coordination between transmitter and intended receiver is needed to assure that the time-frequency partition is synchronized. One embodiment that does not require control communications between transmitter and receiver is to use synchronized time of day to schedule preset partition changeover. Another possible embodiment is to use a pseudorandom number sequence initialized with the same seed to schedule the transitions.

Another embodiment that supports over-the-air tree partition adaptation control is through the use of an embedded control subband or subbands. The idea is to "cloak" the inband control signal by multiplexing it with the data payload symbols in the WPM (or ITOM) waveform. An agreement on which subband or subbands would serve this role is necessary between transmitter and receiver. Use of this control method would not restrict the selection to only those partitions containing the subband(s). The key to this concept is the ability to transmit a request to send to another node on that particular node's control channel, which would require that each node's control channel be known, if only to it's neighbors. The description that follows applies to the dyadic tree structure of WPM and its ITOM variant. The idea is that any particular node, even out of a separate WPM configuration, can still generate a signal that will eventually be decoded at the receiver via the receiver's WPM transform with the control channel data intact. The trick to accomplishing this is preprocessing the control channel data such that it becomes the correct data at the chosen point in the WPM transform.

To explain in more detail, consider a receive node with a designated control channel at (3,4) in its current (still arbitrary) WPM partition as in FIG. 33. The only information about the receive node that the transmit node cares about is the control channel partition ID, in this case (3,4).

If the transmit partition includes the control channel, the process is straightforward. The transmit node simply transmits valid or dummy data everywhere but (3,4) in its own WPM partition and the receiver will demodulate (3,4) as the control subband. This first scenario allows control channel data to pass between two nodes with heterogeneous WPM partitions.

If the transmit partition does not include the designated control channel at (3,4) then the transmitter can preprocess the control channel data such that the sequence placed on the relevant ancestor/descendant channel will eventually be transformed into the appropriate control channel data.

To illustrate, first consider FIG. 34, which shows a transmit WPM partition extending beyond the control channel at (3,4). In this scenario, the control channel data is preprocessed through two levels of the appropriate filters in an analysis tree and the resulting sequence is then placed on the channel (5,19) in the transmit WPM partition so that when it traverses the synthesis transform in the transmitter, the contents of channel (3,4) will be the control channel data which will show up on channel (3,4) of the receive node intact.

Similarly, consider the opposite scenario in FIG. 35, where the transmit partition contains the ancestor channel (1,1) to the relevant control channel (3,4). In this case, the control channel data is preprocessed through two levels of the appropriate filters in a synthesis tree and the resulting sequence is placed on the channel (1,1) in the transmit partition so that when it traverses the analysis tree at the receiver, the contents of channel (3,4) will be the intended control channel data.

Additional alternative embodiments will be apparent to those skilled in the art to which the present invention pertains without departing from its spirit and scope. For example, the shaping filter design is not limited to those described herein, but includes any number of filter designs based on the desired combination of ISI, ICI and stopband attenuation. The disclosed filter bank tree embodiments illustrate a particular interleaving scheme, but the invention is not limited to the disclosed interleaving scheme. Alternative embodiments may include different interleaving schemes or omit interleaving. Accordingly, the scope of the present invention is described by the appended claims and is supported by the foregoing description.

What is claimed is:

1. A wireless communication system, comprising:
    a transmitter for transmitting a radio frequency signal to a receiver, the transmitter including:
        a forward error correction ("FEC") encoder for encoding input bits to generate encoded symbols;
        a complex symbol mapper for mapping the encoded symbols into complex-valued transmission symbols;
        a demultiplexer for generating parallel output symbols from the complex-valued transmission symbols;
        an adaptive interpolated tree orthogonal multiplexing ("ITOM") component for receiving the parallel output symbols and generating an orthogonal multiplexed complex symbol stream at a given sample rate, wherein the ITOM component uses a filter bank tree that spectrally shapes the parallel output symbols to available channel bandwidth on a non-contiguous basis and selectively merges contiguous occupied subbands; and
        a signal processing component for generating the radio frequency signal from the orthogonal multiplexed complex symbol stream.

2. The wireless communication system of claim 1, wherein the receiver comprises:
    an adaptive inverse ITOM ("ITOM$^{-1}$") component for generating parallel received symbols comprising:
        a receiver pulse shaping component for generating a matched filter output from an input derived from the radio frequency signal, wherein the receiver pulse shaping component is matched to the orthogonal multiplexed complex symbol stream associated with the transmitter;
        a decimator for selecting one sample per symbol from the matched filter output;
        a symbol synchronization component for determining a sampling instant for the decimator, wherein the symbol synchronization component uses maximum likelihood ("ML") synchronization that is pulse shape independent and non-data aided;
        a receiver filter bank tree that matches the filter bank tree associated with the transmitter for filtering synchronized samples output from the decimator;
    a multiplexer for generating a serial symbol stream from the filtered synchronized samples; and
    a FEC decoder for decoding the serial symbol stream into output bits.

3. The wireless communication system of claim 1, wherein scalar weights are applied to entry points of the filter bank tree inputs to aid in shaping.

4. The wireless communication system of claim 2, wherein a number of levels of the filter bank tree and the receiver filter bank tree within the ITOM and ITOM$^{-1}$ components is adapted to maintain a specified degree of protection against multipath channel-induced intersymbol interference.

5. The wireless communication system of claim 2, wherein symbol-spaced or fractionally-spaced decision feedback equalization is applied to outputs of the receiver filter bank tree of the ITOM$^{-1}$ component.

6. The wireless communication system of claim 1, wherein transmit power is adapted within the ITOM component on an individual subband basis to maximize throughput or robustness on a channel with interference.

7. The wireless communication system of claim 1, wherein a transmit source constellation is adapted at entry points to the ITOM component on an individual subband basis to maximize throughput or robustness on a channel with interference.

8. The wireless communication system of claim 1, wherein a transmit source forward error correction code rate is adapted at entry points to the ITOM component on an individual subband basis to maximize throughput or robustness on a channel with interference.

9. The wireless communication system of claim 2, wherein the ITOM component or the ITOM$^{-1}$ component is adapted by merging or bypassing entry points to the filter bank tree or the receiver filter bank tree to create combinations that decrease the probability of signal exploitation.

10. The wireless communication system of claim 1, wherein at least one embedded control subband is multiplexed with a data payload and the control subband is used to coordinate adaptation between the transmitter and receiver.

11. The wireless communication system of claim 2, wherein the filter bank tree of the ITOM component and the receiver filter bank tree of the ITOM$^{-1}$ component are based on a Square Root Raised Cosine wavelet scaling function.

12. The wireless communication system of claim 2, wherein the filter bank tree of the ITOM component and the receiver filter bank tree of the ITOM$^{-1}$ component are based on modifications to a cosine-tapered Nyquist filter design for improved stopband attenuation.

13. The wireless communication system of claim 2, wherein the transmitter is further operative to:
  determine spectral occupancy of external signals;
  based on the spectral occupancy of the external signals, determine a structure for the filter bank tree and the receiver filter bank tree to coexist on a non-interfering basis with respect to the external signals; and
  communicate the structure to the ITOM component and the ITOM$^{-1}$ component.

14. A method for communicating radio frequency signals, comprising:
  shaping a waveform, using null-valued inputs to a filter bank tree associated with an interpolated tree orthogonal multiplexing ("ITOM") component, for operation on a non-contiguous spectral basis;
  pruning the filter bank tree associated with the ITOM component to merge two or more contiguous occupied subbands for multiresolution orthogonal multiplexing;
  generating an orthogonal multiplexed complex symbol stream using the shaped waveform from the ITOM component; and
  transmitting a radio frequency signal derived from the orthogonal multiplexed complex symbol stream.

15. The method of claim 14, further comprising:
  receiving the radio frequency signal;
  adaptively pruning a receive filter bank tree associated with an inverse ITOM ("ITOM$^{-1}$") component that uses filters matched to filters in the filter bank tree associated with the ITOM component so that the pruned receive filter bank tree associated with the ITOM$^{-1}$ component matches the pruned filter bank tree associated with the ITOM component;
  applying a matched pulse shaping filter to an input derived from the radio frequency signal, to produce a matched filter output;
  using a symbol timing estimate to select one sample per symbol from the matched filter output;
  generating parallel received symbols from the selected samples using the ITOM$^{-1}$ component;
  combining the parallel received symbols into a serial symbol stream, while adaptively discarding the parallel outputs corresponding to null value inputs to the ITOM component at the transmitter; and
  decoding the serial symbol stream to obtain detected bits.

16. The method of claim 15, further comprising:
  determining spectral occupancy of external signals;
  based on the spectral occupancy of the external signals, determining a structure for the filter bank tree and the receive filter bank tree to coexist on a non-interfering basis with respect to the external signals; and
  communicating the structure to the ITOM component and the ITOM$^{-1}$ component.

17. The method of claim 14, wherein shaping a waveform includes applying scalar weights to entry points of the filter branch tree to aid in spectral shaping.

18. The method of claim 15, wherein shaping a waveform includes adapting a number of levels of the filter bank tree and the receive filter bank tree within the ITOM and ITOM$^{-1}$ components to maintain a specified degree of protection against multipath channel-induced intersymbol interference.

19. The method of claim 15, further comprising applying symbol-spaced or fractionally-spaced decision feedback equalization to outputs of the receive filter bank tree associated with the ITOM$^{-1}$ component.

20. The method of claim 14, further comprising adapting transmit power within the ITOM component on an individual subband basis to maximize throughput or robustness on a channel with interference.

21. The method of claim 14, further comprising adapting a transmit source constellation at entry points to the ITOM component on an individual subband basis to maximize throughput or robustness on a channel with interference.

22. The method of claim 14, further comprising adapting a transmit source forward error correction code rate at entry points to the ITOM component on an individual subband basis to maximize throughput or robustness on a channel with interference.

23. The method of claim 15, further comprising adapting the ITOM component or the ITOM$^{-1}$ component by merging or bypassing entry points to the filter bank tree and the receive filter bank tree to create combinations that decrease the probability of signal exploitation.

24. The method of claim 14, wherein at least one embedded control subband is multiplexed with a data payload, further comprising coordinating adaptation between the transmitter and receiver using the control subband.

25. The method of claim 15, wherein the filter bank tree associated with the ITOM component and the receive filter bank tree associated with the ITOM$^{-1}$ component are based on a Square Root Raised Cosine wavelet scaling function.

26. The method of claim 15, wherein the filter bank tree associated with the ITOM component and the receive filter bank tree associated with the ITOM$^{-1}$ component are based on modifications to a cosine-tapered Nyquist filter design for improved stopband attenuation.

27. A wireless communication system, comprising:
  a transmitter for transmitting a radio frequency signal to a receiver, the transmitter including an adaptive interpolated tree orthogonal multiplexing ("ITOM") component for receiving parallel symbols and generating an orthogonal multiplexed complex symbol stream at a given sample rate, wherein the ITOM component includes a filter bank tree to spectrally shape the waveform to available bandwidth on a non-contiguous basis and to selectively merge occupied contiguous subbands,
  wherein the filter bank tree performs spectral shaping at each of a plurality of tree branch entry points of the filter bank tree and spectral replicate filtering at each of a plurality of upsampling stages of the filter bank tree.

28. The wireless communication system of claim 27, further comprising:
  a receiver for receiving a radio frequency signal from the transmitter, the receiver including an adaptive inverse ITOM ("ITOM$^{-1}$") component for generating parallel received symbols from received samples,
  wherein the ITOM$^{-1}$ component includes a receiver filter bank tree that matches the filter bank tree associated with the ITOM component.

29. The wireless communication system of claim 28, wherein the receiver further includes:
   a symbol synchronization component for determining a sampling instant, wherein the symbol synchronization component uses maximum likelihood ("ML") synchronization that is pulse shape independent and non-data aided.

30. The wireless communication system of claim 27, wherein the filter bank tree includes a shaping filter at each tree branch entry point to perform the spectral shaping.

31. The wireless communication system of claim 30, wherein the filter bank tree includes a half band interpolation filter at upsampling stages to perform spectral replicate filtering.

32. The wireless communication system of claim 28, wherein the transmitter is further operative to:
   determine spectral occupancy of external signals;
   based on the spectral occupancy of the external signals, determine a structure for the filter bank tree and the receiver filter bank tree to coexist on a non-interfering basis with respect to the external signals; and
   communicate the structure to the ITOM component and the $ITOM^{-1}$ component.

33. The wireless communication system of claim 27, wherein scalar weights are applied to entry points of the filter branch tree to aid in spectral shaping.

34. The wireless communication system of claim 28, wherein the ITOM component or the $ITOM^{-1}$ component is adapted by merging or bypassing entry points to the filter bank tree and the receiver filter bank tree to create combinations that decrease the probability of signal exploitation.

35. The wireless communication system of claim 27, wherein at least one embedded control subband is multiplexed with a data payload, and the control subband is used to coordinate adaptation between the transmitter and receiver.

36. The wireless communication system of claim 28, wherein the filter bank tree associated with the ITOM component and the receiver filter bank tree associated with the $ITOM^{-1}$ component are based on a Square Root Raised Cosine wavelet scaling function.

37. The wireless communication system of claim 28, wherein the filter bank tree associated with the ITOM component and the receiver filter bank tree associated with the $ITOM^{-1}$ component are based on modifications to a cosine-tapered Nyquist filter design for improved stopband attenuation.

38. The wireless communication system of claim 28, wherein a number of levels of the filter bank tree and the receiver filter bank tree within the ITOM and $ITOM^{-1}$ components is adapted to maintain a specified degree of protection against multipath channel-induced intersymbol interference.

* * * * *